(12) United States Patent
Ure et al.

(10) Patent No.: US 11,438,553 B1
(45) Date of Patent: *Sep. 6, 2022

(54) SYSTEM, METHOD AND APPARATUS FOR REMOTE MONITORING

(71) Applicant: ICN ACQUISITION, LLC, Tysons, VA (US)

(72) Inventors: Russell Ure, Ottawa (CA); Reza Kazemi, Ottawa (CA); Christian Molson, Ottawa (CA); Heather McIntosh, Ottawa (CA)

(73) Assignee: ICN ACQUISITION, LLC, Tysons, VA (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/866,521

(22) Filed: May 4, 2020

Related U.S. Application Data

(63) Continuation of application No. 14/456,449, filed on Aug. 11, 2014, now Pat. No. 10,645,347.

(Continued)

(51) Int. Cl.
*H04N 7/18* (2006.01)
*H04Q 9/00* (2006.01)
(Continued)

(52) U.S. Cl.
CPC ............ *H04N 7/183* (2013.01); *G08B 5/223* (2013.01); *H04L 67/12* (2013.01); *H04N 7/181* (2013.01);
(Continued)

(58) Field of Classification Search
CPC ... H04N 7/18–7/188; H04Q 9/00–9/16; H04Q 2209/00–2209/823; G08B 5/223;
(Continued)

(56) References Cited

U.S. PATENT DOCUMENTS

| 686,838 A | 11/1901 | Richard |
|---|---|---|
| 4,141,006 A | 2/1979 | Braxton |

(Continued)

FOREIGN PATENT DOCUMENTS

| AU | 2005223267 | 12/2010 |
|---|---|---|
| AU | 2010297957 | 5/2012 |

(Continued)

OTHER PUBLICATIONS

Mike Haldas, "Zavio IP Security Cameras Support Push Video Notification to Mobile App", Security Camera & Video Surveillance Blog, pp. 1-7 (Year: 2013).*

(Continued)

*Primary Examiner* — Clayton R Williams
(74) *Attorney, Agent, or Firm* — Fish & Richardson P.C.

(57) ABSTRACT

A monitoring unit for security and automation in a premises are described. The monitoring unit uses remote configuration and control to enable monitoring of a premises. The monitoring unit provides multiple monitoring functions to respond to events within the space and alert a user at a remote device like a smartphone. An image sensor provides a wide field of view which can be segmented on the mobile device to enable specific areas to be viewed enabling the user to view the area and be alerted when an event occurs based upon a rules based configuration.

20 Claims, 20 Drawing Sheets

Related U.S. Application Data

(60) Provisional application No. 61/864,248, filed on Aug. 9, 2013.

(51) Int. Cl.
*H04W 12/06* (2021.01)
*H04L 67/12* (2022.01)
*G08B 5/22* (2006.01)
*H04W 4/12* (2009.01)

(52) U.S. Cl.
CPC .............. *H04Q 9/00* (2013.01); *H04W 4/12* (2013.01); *H04W 12/06* (2013.01); *G08C 2201/93* (2013.01); *H04Q 2209/43* (2013.01); *H04Q 2209/823* (2013.01)

(58) Field of Classification Search
CPC .. G08C 2201/93; H04L 67/00–67/125; H04W 4/12; H04W 12/06
See application file for complete search history.

(56) References Cited

U.S. PATENT DOCUMENTS

| | | |
|---|---|---|
| 4,257,038 A | 3/1981 | Rounds et al. |
| 4,363,031 A | 12/1982 | Reinowitz |
| 4,520,503 A | 5/1985 | Kirst et al. |
| 4,559,526 A | 12/1985 | Tani et al. |
| 4,574,305 A | 3/1986 | Campbell |
| 4,581,606 A | 4/1986 | Mallory |
| D284,084 S | 6/1986 | Ferrara, Jr. |
| 4,641,127 A | 2/1987 | Hogan et al. |
| 4,652,859 A | 3/1987 | Van Wienen |
| 4,694,282 A | 9/1987 | Tamura et al. |
| 4,730,184 A | 3/1988 | Bach |
| 4,754,261 A | 6/1988 | Marino |
| 4,779,007 A | 10/1988 | Schlanger |
| 4,801,924 A | 1/1989 | Burgmann et al. |
| 4,812,820 A | 3/1989 | Chatwin |
| 4,833,449 A | 5/1989 | Gaffigan |
| 4,855,713 A | 8/1989 | Brunius |
| 4,860,185 A | 8/1989 | Brewer et al. |
| 4,897,630 A | 1/1990 | Nykerk |
| 4,918,623 A | 4/1990 | Lockitt et al. |
| 4,951,029 A | 8/1990 | Severson |
| 4,959,713 A | 9/1990 | Morotomi et al. |
| 4,993,059 A | 2/1991 | Smith et al. |
| 4,994,787 A | 2/1991 | Kratt et al. |
| 5,023,901 A | 6/1991 | Sloan et al. |
| 5,086,385 A | 2/1992 | Launey et al. |
| 5,091,780 A | 2/1992 | Pomerleau |
| 5,111,288 A | 5/1992 | Blackshear |
| 5,132,968 A | 7/1992 | Cephus |
| 5,134,644 A | 7/1992 | Garton et al. |
| 5,159,315 A | 10/1992 | Schultz et al. |
| 5,160,879 A | 11/1992 | Tortola et al. |
| D337,569 S | 7/1993 | Kando |
| 5,227,776 A | 7/1993 | St Arefoss |
| 5,237,305 A | 8/1993 | Ishikuro et al. |
| 5,299,971 A | 4/1994 | Hart |
| 5,319,394 A | 6/1994 | Dukek |
| 5,319,698 A | 6/1994 | Glidewell |
| 5,334,974 A | 8/1994 | Simms et al. |
| 5,359,363 A | 10/1994 | Kuban et al. |
| 5,438,607 A | 8/1995 | Przygoda, Jr. |
| 5,446,445 A | 8/1995 | Bloomfield |
| 5,465,081 A | 11/1995 | Todd |
| 5,471,194 A | 11/1995 | Guscott |
| 5,486,812 A | 1/1996 | Todd |
| 5,499,014 A | 3/1996 | Greenwaldt |
| 5,499,196 A | 3/1996 | Pacheco |
| 5,519,878 A | 5/1996 | Dolin, Jr. |
| 5,578,989 A | 11/1996 | Pedtke |
| 5,579,197 A | 11/1996 | Mengel et al. |
| D377,034 S | 12/1996 | Matsushita |
| 5,587,705 A | 12/1996 | Morris |
| 5,623,601 A | 4/1997 | Vu |
| 5,625,338 A | 4/1997 | Pildner et al. |
| 5,630,216 A | 5/1997 | Mcewan |
| 5,651,070 A | 7/1997 | Blunt |
| D389,501 S | 1/1998 | Mascarenas, Sr. |
| 5,715,394 A | 2/1998 | Jabs |
| 5,717,379 A | 2/1998 | Peters |
| 5,717,578 A | 2/1998 | Afzal |
| 5,731,756 A | 3/1998 | Roddy |
| 5,777,551 A | 7/1998 | Hess |
| 5,838,996 A | 11/1998 | deCarmo |
| 5,874,952 A | 2/1999 | Morgan |
| 5,886,894 A | 3/1999 | Rakoff |
| 5,892,442 A | 4/1999 | Ozery |
| 5,907,279 A | 5/1999 | Bruins et al. |
| 5,909,183 A | 6/1999 | Borgstahl et al. |
| 5,914,655 A | 6/1999 | Clifton et al. |
| 5,943,394 A | 8/1999 | Ader et al. |
| 5,955,946 A | 9/1999 | Beheshti et al. |
| 5,958,053 A | 9/1999 | Denker |
| 5,959,528 A | 9/1999 | Right et al. |
| 5,963,916 A | 10/1999 | Kaplan |
| D416,910 S | 11/1999 | Vasquez |
| 5,991,795 A | 11/1999 | Howard |
| 6,032,036 A | 2/2000 | Maystre |
| 6,037,991 A | 3/2000 | Thro |
| 6,038,289 A | 3/2000 | Sands |
| 6,040,770 A | 3/2000 | Britton |
| 6,049,272 A | 4/2000 | Lee |
| 6,049,273 A | 4/2000 | Hess |
| 6,052,052 A | 4/2000 | Delmonaco |
| 6,060,994 A | 5/2000 | Chen |
| 6,067,346 A | 5/2000 | Akhteruzzaman |
| 6,067,440 A | 5/2000 | Diefe |
| 6,078,253 A | 6/2000 | Fowler |
| 6,078,257 A | 6/2000 | Ferraro |
| 6,085,030 A | 7/2000 | Whitehead |
| 6,104,785 A | 8/2000 | Chen |
| 6,134,591 A | 10/2000 | Nickles |
| 6,138,249 A | 10/2000 | Nolet |
| 6,140,987 A | 10/2000 | Stein et al. |
| 6,181,341 B1 | 1/2001 | Shinagawa |
| 6,192,418 B1 | 2/2001 | Hale et al. |
| 6,198,475 B1 | 3/2001 | Kunimats |
| 6,198,479 B1 | 3/2001 | Humpleman et al. |
| 6,208,247 B1 | 3/2001 | Agre et al. |
| 6,211,783 B1 | 4/2001 | Wang |
| 6,219,677 B1 | 4/2001 | Howard |
| 6,246,320 B1 | 6/2001 | Monroe |
| 6,271,752 B1 | 8/2001 | Vaios |
| 6,281,790 B1 | 8/2001 | Kimmel et al. |
| 6,282,569 B1 | 8/2001 | Wallis et al. |
| 6,286,038 B1 | 9/2001 | Reichmeyer et al. |
| 6,288,716 B1 | 9/2001 | Humpleman et al. |
| 6,289,382 B1 | 9/2001 | Bowman-Amuah |
| 6,295,346 B1 | 9/2001 | Markowitz et al. |
| 6,320,506 B1 | 11/2001 | Ferraro |
| D451,529 S | 12/2001 | Vasquez |
| 6,331,122 B1 | 12/2001 | Wu |
| 6,351,829 B1 | 2/2002 | Dupont et al. |
| 6,353,891 B1 | 3/2002 | Borella et al. |
| 6,363,417 B1 | 3/2002 | Howard et al. |
| 6,363,422 B1 | 3/2002 | Hunter et al. |
| 6,369,695 B1 | 4/2002 | Horon |
| 6,369,705 B1 | 4/2002 | Kennedy |
| 6,370,436 B1 | 4/2002 | Howard et al. |
| 6,374,079 B1 | 4/2002 | Hsu |
| 6,377,861 B1 | 4/2002 | York |
| 6,385,772 B1 | 5/2002 | Courtney |
| 6,400,265 B1 | 6/2002 | Saylor et al. |
| D460,472 S | 7/2002 | Wang |
| 6,418,037 B1 | 7/2002 | Zhang |
| 6,433,683 B1 | 8/2002 | Robinson |
| D464,328 S | 10/2002 | Vasquez et al. |
| D464,948 S | 10/2002 | Vasquez et al. |
| 6,462,507 B2 | 10/2002 | Fisher et al. |
| 6,462,663 B1 | 10/2002 | Wilson et al. |
| 6,467,084 B1 | 10/2002 | Howard et al. |

(56) References Cited

U.S. PATENT DOCUMENTS

| | | |
|---|---|---|
| 6,480,901 B1 | 11/2002 | Weber et al. |
| 6,493,020 B1 | 12/2002 | Stevenson et al. |
| 6,496,927 B1 | 12/2002 | McGrane et al. |
| 6,529,723 B1 | 3/2003 | Bentley |
| 6,542,075 B2 | 4/2003 | Barker et al. |
| 6,553,336 B1 | 4/2003 | Johnson et al. |
| 6,563,800 B1 | 5/2003 | Salo et al. |
| 6,574,234 B1 | 6/2003 | Myer et al. |
| 6,580,950 B1 | 6/2003 | Johnson et al. |
| 6,587,455 B1 | 7/2003 | Ray et al. |
| 6,587,736 B2 | 7/2003 | Howard et al. |
| 6,591,094 B1 | 7/2003 | Bentley |
| 6,597,703 B1 | 7/2003 | Li et al. |
| 6,601,086 B1 | 7/2003 | Howard et al. |
| 6,603,488 B2 | 8/2003 | Humpleman et al. |
| 6,609,127 B1 | 8/2003 | Lee et al. |
| 6,615,088 B1 | 9/2003 | Myer et al. |
| 6,621,827 B1 | 9/2003 | Rezvani et al. |
| 6,624,750 B1 | 9/2003 | Marman et al. |
| 6,631,416 B2 | 10/2003 | Bendinflu et al. |
| 6,636,893 B1 | 10/2003 | Fong |
| 6,643,652 B2 | 11/2003 | Helgeson et al. |
| 6,643,669 B1 | 11/2003 | Novak et al. |
| 6,648,682 B1 | 11/2003 | Wu |
| 6,658,091 B1 | 12/2003 | Naidoo |
| 6,661,340 B1 | 12/2003 | Saylor |
| 6,686,838 B1 | 2/2004 | Rezvani |
| 6,690,411 B2 | 2/2004 | Naidoo |
| 6,693,530 B1 | 2/2004 | Dowens |
| 6,693,545 B2 | 2/2004 | Brown |
| 6,697,103 B1 | 2/2004 | Fernandez |
| 6,704,786 B1 | 3/2004 | Gupta |
| 6,721,689 B2 | 4/2004 | Markle |
| 6,721,747 B2 | 4/2004 | Lipkin |
| 6,738,824 B1 | 5/2004 | Blair |
| 6,754,717 B1 | 6/2004 | Day |
| 6,756,896 B2 | 6/2004 | Ford |
| 6,756,998 B1 | 6/2004 | Bilger |
| 6,762,686 B1 | 7/2004 | Tabe |
| 6,778,085 B2 | 8/2004 | Faulkner |
| 6,781,509 B1 | 8/2004 | Oppedahl |
| 6,785,542 B1 | 8/2004 | Blight |
| 6,789,147 B1 | 9/2004 | Kessler |
| 6,795,322 B2 | 9/2004 | Aihara |
| 6,798,344 B2 | 9/2004 | Faulkner |
| 6,810,409 B1 | 10/2004 | Fry |
| 6,826,233 B1 | 11/2004 | Oosawa |
| 6,850,252 B1 | 2/2005 | Hoffberg |
| 6,856,236 B2 | 2/2005 | Christensen |
| 6,865,690 B2 | 3/2005 | Kocin |
| 6,873,256 B2 | 3/2005 | Lemelson |
| D504,889 S | 5/2005 | Andre et al. |
| 6,891,838 B1 | 5/2005 | Petite |
| 6,912,429 B1 | 6/2005 | Bilger |
| 6,918,112 B2 | 7/2005 | Bourke-Dunphy |
| 6,928,148 B2 | 8/2005 | Simon |
| 6,930,599 B2 | 8/2005 | Naidoo |
| 6,930,730 B2 | 8/2005 | Maxson |
| 6,931,445 B2 | 8/2005 | Davis |
| 6,943,681 B2 | 9/2005 | Rezvani |
| 6,956,477 B2 | 10/2005 | Chun |
| 6,959,341 B1 | 10/2005 | Leung |
| 6,959,393 B2 | 10/2005 | Hollis |
| 6,963,981 B1 | 11/2005 | Bailey |
| 6,965,313 B1 | 11/2005 | Saylor |
| 6,970,183 B1 | 11/2005 | Monroe |
| 6,972,676 B1 | 12/2005 | Kimmel |
| 6,975,220 B1 | 12/2005 | Foodman |
| 6,977,485 B1 | 12/2005 | Wei |
| 6,990,591 B1 | 1/2006 | Pearson |
| 7,015,806 B2 | 3/2006 | Naidoo |
| 7,016,970 B2 | 3/2006 | Harumoto |
| 7,020,697 B1 | 3/2006 | Goodman |
| 7,020,701 B1 | 3/2006 | Gelvin |
| 7,024,676 B1 | 4/2006 | Klopfenstein |
| 7,030,752 B2 | 4/2006 | Tyroler |
| 7,032,002 B1 | 4/2006 | Rezvani |
| 7,034,681 B2 | 4/2006 | Yamamoto |
| 7,035,907 B1 | 4/2006 | Decasper |
| 7,039,391 B2 | 5/2006 | Rezvani |
| 7,043,537 B1 | 5/2006 | Pratt |
| 7,047,088 B2 | 5/2006 | Nakamura |
| 7,047,092 B2 | 5/2006 | Wimsatt |
| 7,053,764 B2 | 5/2006 | Stilp |
| 7,072,934 B2 | 7/2006 | Helgeson |
| 7,075,429 B2 | 7/2006 | Marshall |
| 7,079,020 B2 | 7/2006 | Stilp |
| 7,080,046 B1 | 7/2006 | Rezvani |
| 7,081,813 B2 | 7/2006 | Winick |
| 7,082,460 B2 | 7/2006 | Hansen |
| 7,085,937 B1 | 8/2006 | Rezvani |
| 7,099,944 B1 | 8/2006 | Anschutz |
| 7,099,994 B2 | 8/2006 | Thayer |
| 7,103,152 B2 | 9/2006 | Naidoo |
| 7,106,176 B2 | 9/2006 | La |
| 7,107,322 B1 | 9/2006 | Freeny |
| 7,110,774 B1 | 9/2006 | Davis |
| 7,113,090 B1 | 9/2006 | Saylor |
| 7,113,099 B2 | 9/2006 | Tyroler |
| 7,114,554 B2 | 10/2006 | Bergman |
| 7,119,674 B2 | 10/2006 | Sefton |
| 7,120,232 B2 | 10/2006 | Naido |
| 7,120,233 B2 | 10/2006 | Naidoo |
| 7,130,383 B2 | 10/2006 | Naidoo |
| 7,130,585 B1 | 10/2006 | Ollis |
| 7,148,810 B2 | 12/2006 | Bhat |
| 7,149,798 B2 | 12/2006 | Rezvan |
| 7,149,814 B2 | 12/2006 | Neufeld |
| 7,164,907 B2 | 1/2007 | Cochran |
| 7,166,987 B2 | 1/2007 | Lee |
| 7,174,564 B1 | 2/2007 | Weatherspoon |
| 7,183,907 B2 | 2/2007 | Simon |
| 7,203,486 B2 | 4/2007 | Patel |
| 7,209,945 B2 | 4/2007 | Hicks |
| 7,212,570 B2 | 5/2007 | Akiyama |
| 7,218,217 B2 | 5/2007 | Adonailo |
| 7,222,359 B2 | 5/2007 | Freund |
| 7,237,267 B2 | 6/2007 | Rayes |
| 7,248,161 B2 | 7/2007 | Spoltore |
| 7,249,317 B1 | 7/2007 | Nakagawa |
| 7,250,854 B2 | 7/2007 | Rezvani |
| 7,250,859 B2 | 7/2007 | Martin |
| 7,254,779 B1 | 8/2007 | Rezvani |
| 7,262,690 B2 | 8/2007 | Heaton |
| 7,277,010 B2 | 10/2007 | Joao |
| 7,298,253 B2 | 11/2007 | Petricoin |
| 7,305,461 B2 | 12/2007 | Ullman |
| 7,310,115 B2 | 12/2007 | Tanimoto |
| 7,313,102 B2 | 12/2007 | Stephenson |
| D558,460 S | 1/2008 | Yu et al. |
| D558,756 S | 1/2008 | Andre et al. |
| 7,337,217 B2 | 2/2008 | Wang |
| 7,337,473 B2 | 2/2008 | Chang |
| 7,343,619 B2 | 3/2008 | Ofek |
| 7,349,761 B1 | 3/2008 | Cruse |
| 7,349,967 B2 | 3/2008 | Wang |
| 7,367,045 B2 | 4/2008 | Ofek |
| 7,370,115 B2 | 5/2008 | Bae |
| 7,383,339 B1 | 6/2008 | Meenan |
| 7,403,838 B2 | 7/2008 | Deen |
| 7,409,045 B2 | 8/2008 | Naidoo |
| 7,409,451 B1 | 8/2008 | Meenan |
| 7,412,447 B2 | 8/2008 | Hilbert |
| 7,425,101 B2 | 9/2008 | Cheng |
| 7,428,585 B1 | 9/2008 | Owens |
| 7,430,614 B2 | 9/2008 | Shen |
| 7,437,753 B2 | 10/2008 | Nahum |
| 7,440,434 B2 | 10/2008 | Chaskar |
| 7,457,869 B2 | 11/2008 | Kernan |
| 7,469,139 B2 | 12/2008 | Van |
| 7,469,294 B1 | 12/2008 | Luo |
| 7,469,381 B2 | 12/2008 | Ording |
| D584,738 S | 1/2009 | Kim et al. |
| D585,399 S | 1/2009 | Hwang |

(56) References Cited

U.S. PATENT DOCUMENTS

| | | |
|---|---|---|
| 7,479,949 B2 | 1/2009 | Jobs |
| 7,480,713 B2 | 1/2009 | Ullman |
| 7,480,724 B2 | 1/2009 | Zilmer |
| 7,498,695 B2 | 3/2009 | Gaudreau |
| 7,506,052 B2 | 3/2009 | Wian |
| 7,509,687 B2 | 3/2009 | Ofek |
| 7,511,614 B2 | 3/2009 | Stilp |
| 7,512,965 B1 | 3/2009 | Amour |
| 7,526,539 B1 | 4/2009 | Hsu |
| 7,526,762 B1 | 4/2009 | Astala |
| 7,528,723 B2 | 5/2009 | Fast |
| 7,551,071 B2 | 6/2009 | Bennett |
| 7,554,934 B2 | 6/2009 | Abraham |
| 7,558,379 B2 | 7/2009 | Winick |
| 7,568,018 B1 | 7/2009 | Hove |
| 7,571,459 B2 | 8/2009 | Ganesh |
| 7,577,420 B2 | 8/2009 | Sprinivasan |
| 7,587,464 B2 | 9/2009 | Moorer |
| D602,014 S | 10/2009 | Andre et al. |
| D602,015 S | 10/2009 | Andre et al. |
| D602,017 S | 10/2009 | Andre et al. |
| D602,486 S | 10/2009 | Andre et al. |
| D602,487 S | 10/2009 | Maskatia |
| 7,619,512 B2 | 11/2009 | Trundle |
| 7,620,427 B2 | 11/2009 | Shanahan |
| 7,627,665 B2 | 12/2009 | Barker |
| 7,633,385 B2 | 12/2009 | Cohn |
| 7,634,519 B2 | 12/2009 | Creamer |
| 7,651,530 B2 | 1/2010 | Winick |
| 7,653,911 B2 | 1/2010 | Doshi |
| 7,681,201 B2 | 3/2010 | Dale |
| 7,697,028 B1 | 4/2010 | Johnson |
| 7,701,970 B2 | 4/2010 | Krits |
| D615,083 S | 5/2010 | Andre et al. |
| 7,711,796 B2 | 5/2010 | Gutt |
| 7,734,020 B2 | 6/2010 | Elliot |
| 7,734,286 B2 | 6/2010 | Almeda |
| 7,734,906 B2 | 6/2010 | Orlando |
| 7,739,596 B2 | 6/2010 | Clarke |
| 7,751,409 B1 | 7/2010 | Carolan |
| 7,787,863 B2 | 8/2010 | Groenendaal |
| D624,896 S | 10/2010 | Park et al. |
| 7,813,538 B2 | 10/2010 | Carroll et al. |
| D626,437 S | 11/2010 | Lee et al. |
| 7,827,252 B2 | 11/2010 | Hopmann |
| 7,855,635 B2 | 12/2010 | Cohn |
| 7,859,404 B2 | 12/2010 | Chul |
| 7,882,537 B2 | 2/2011 | Okajo |
| 7,884,855 B2 | 2/2011 | Ortiz |
| 7,890,612 B2 | 2/2011 | Todd |
| 7,911,341 B2 | 3/2011 | Raji |
| D636,769 S | 4/2011 | Wood et al. |
| 7,921,686 B2 | 4/2011 | Bagepalli |
| D637,596 S | 5/2011 | Akana et al. |
| D639,805 S | 6/2011 | Song et al. |
| D640,663 S | 6/2011 | Arnholt |
| 7,956,736 B2 | 6/2011 | Cohn |
| 7,970,863 B1 | 6/2011 | Fontaine |
| D641,018 S | 7/2011 | Lee et al. |
| 7,974,235 B2 | 7/2011 | Ghozati |
| D642,563 S | 8/2011 | Akana et al. |
| 8,001,219 B2 | 8/2011 | Moorer |
| D645,015 S | 9/2011 | Lee et al. |
| D645,435 S | 9/2011 | Kim et al. |
| D645,833 S | 9/2011 | Seflic et al. |
| 8,022,833 B2 | 9/2011 | Cho |
| 8,028,041 B2 | 9/2011 | Olliphant |
| 8,042,049 B2 | 10/2011 | Killian |
| 8,046,411 B2 | 10/2011 | Hayashi |
| D650,381 S | 12/2011 | Park et al. |
| 8,073,931 B2 | 12/2011 | Dawes |
| 8,086,702 B2 | 12/2011 | Baum |
| 8,086,703 B2 | 12/2011 | Baum |
| D654,460 S | 2/2012 | Kim et al. |
| D654,497 S | 2/2012 | Lee |
| 8,122,131 B2 | 2/2012 | Baum |
| 8,125,184 B2 | 2/2012 | Raji |
| D656,137 S | 3/2012 | Chung et al. |
| 8,140,658 B1 | 3/2012 | Gelvin |
| 8,159,519 B2 | 4/2012 | Kurtz |
| 8,200,827 B1 | 6/2012 | Hunyad |
| 8,209,400 B2 | 6/2012 | Baum |
| D663,298 S | 7/2012 | Song et al. |
| D664,540 S | 7/2012 | Kim et al. |
| 8,214,496 B2 | 7/2012 | Gutt |
| 8,224,122 B2 | 7/2012 | Cohen et al. |
| D664,954 S | 8/2012 | Kim et al. |
| D666,198 S | 8/2012 | Van |
| 8,239,477 B2 | 8/2012 | Sharma |
| D667,395 S | 9/2012 | John et al. |
| D667,396 S | 9/2012 | Lee |
| D667,397 S | 9/2012 | Koh |
| D667,398 S | 9/2012 | Koh |
| D667,399 S | 9/2012 | Koh |
| 8,269,623 B2 | 9/2012 | Addy |
| D668,650 S | 10/2012 | Koh |
| D668,651 S | 10/2012 | Han |
| D668,652 S | 10/2012 | Kim et al. |
| D669,469 S | 10/2012 | Kim et al. |
| D670,692 S | 11/2012 | Kang |
| D671,514 S | 11/2012 | Akana et al. |
| 8,311,526 B2 | 11/2012 | Forstall |
| D671,938 S | 12/2012 | Hsu et al. |
| D672,344 S | 12/2012 | Li |
| D672,345 S | 12/2012 | Li |
| D672,739 S | 12/2012 | Sin |
| D672,768 S | 12/2012 | Huang et al. |
| 8,335,842 B2 | 12/2012 | Raji |
| 8,335,854 B2 | 12/2012 | Eldering |
| D673,561 S | 1/2013 | Hyun et al. |
| D673,948 S | 1/2013 | Andre et al. |
| D673,950 S | 1/2013 | Li et al. |
| D674,369 S | 1/2013 | Jaewoong |
| D675,203 S | 1/2013 | Yang |
| D675,588 S | 2/2013 | Park |
| D675,612 S | 2/2013 | Andre et al. |
| D676,443 S | 2/2013 | Canizares |
| D676,819 S | 2/2013 | Choi |
| D677,255 S | 3/2013 | McManigal et al. |
| D677,640 S | 3/2013 | Kim et al. |
| D677,659 S | 3/2013 | Akana et al. |
| D677,660 S | 3/2013 | Groene et al. |
| D678,271 S | 3/2013 | Chiu |
| D678,272 S | 3/2013 | Groene et al. |
| D678,877 S | 3/2013 | Groene et al. |
| D679,706 S | 4/2013 | Tang et al. |
| D680,151 S | 4/2013 | Katori |
| D680,524 S | 4/2013 | Feng et al. |
| D681,032 S | 4/2013 | Akana et al. |
| D681,583 S | 5/2013 | Park |
| D681,591 S | 5/2013 | Sung |
| D681,632 S | 5/2013 | Akana et al. |
| D682,239 S | 5/2013 | Yeh et al. |
| 8,451,986 B2 | 5/2013 | Cohn |
| D684,553 S | 6/2013 | Kim et al. |
| D684,968 S | 6/2013 | Smith |
| 8,473,619 B2 | 6/2013 | Baum |
| D685,778 S | 7/2013 | Fahrendorff et al. |
| D685,783 S | 7/2013 | Bryan et al. |
| 8,478,844 B2 | 7/2013 | Baum |
| 8,478,871 B2 | 7/2013 | Gutt |
| 8,483,853 B1 | 7/2013 | Lambourne |
| 8,499,038 B1 | 7/2013 | Vucurevich |
| 8,520,068 B2 | 8/2013 | Naidoo |
| 8,525,664 B2 | 9/2013 | Hadizad |
| 8,543,665 B2 | 9/2013 | Ansari |
| 8,570,993 B2 | 10/2013 | Austin et al. |
| 8,584,199 B1 | 11/2013 | Chen |
| 8,612,591 B2 | 12/2013 | Dawes |
| 8,675,071 B1 | 3/2014 | Slavin |
| 8,730,834 B2 | 5/2014 | Marusca |
| 8,836,467 B1 | 9/2014 | Cohn |
| 8,902,740 B2 | 12/2014 | Hicks |
| 8,914,526 B1 | 12/2014 | Lindquist |

(56) References Cited

U.S. PATENT DOCUMENTS

| | | |
|---|---|---|
| 8,935,236 B2 | 1/2015 | Morita |
| 9,529,440 B2 | 12/2016 | Piemonte et al. |
| 2001/0016501 A1 | 8/2001 | King |
| 2001/0030597 A1 | 10/2001 | Inoue |
| 2001/0034754 A1 | 10/2001 | Elwahab |
| 2002/0004828 A1 | 1/2002 | Davis |
| 2002/0026476 A1 | 2/2002 | Miyazaki |
| 2002/0026531 A1 | 2/2002 | Keane |
| 2002/0027504 A1 | 3/2002 | Davis |
| 2002/0029276 A1 | 3/2002 | Bendineili |
| 2002/0038380 A1 | 3/2002 | Brawn |
| 2002/0052913 A1 | 5/2002 | Yamada |
| 2002/0059637 A1 | 5/2002 | Rakib |
| 2002/0083342 A1 | 6/2002 | Webb |
| 2002/0095490 A1 | 7/2002 | Barker |
| 2002/0099809 A1 | 7/2002 | Lee |
| 2002/0099829 A1 | 7/2002 | Richards |
| 2002/0103898 A1 | 8/2002 | Moyer |
| 2002/0103927 A1 | 8/2002 | Parent |
| 2002/0107910 A1 | 8/2002 | Zhao |
| 2002/0109580 A1 | 8/2002 | Shreve |
| 2002/0111698 A1 | 8/2002 | Graziano |
| 2002/0112051 A1 | 8/2002 | Ullman |
| 2002/0112182 A1 | 8/2002 | Chang |
| 2002/0114439 A1 | 8/2002 | Dunlap |
| 2002/0116117 A1 | 8/2002 | Martens |
| 2002/0118107 A1 | 8/2002 | Yamamoto |
| 2002/0120790 A1 | 8/2002 | Schwalb |
| 2002/0128728 A1 | 9/2002 | Murakami |
| 2002/0133539 A1 | 9/2002 | Monday |
| 2002/0133578 A1 | 9/2002 | Wu |
| 2002/0143923 A1 | 10/2002 | Alexander |
| 2002/0147982 A1 | 10/2002 | Naidoo |
| 2002/0156564 A1 | 10/2002 | Preston |
| 2002/0163534 A1 | 11/2002 | Choi |
| 2002/0163997 A1 | 11/2002 | Bergman |
| 2002/0165006 A1 | 11/2002 | Haller |
| 2002/0174367 A1 | 11/2002 | Kimmel |
| 2002/0177428 A1 | 11/2002 | Menard |
| 2002/0180579 A1 | 12/2002 | Nagaoka |
| 2002/0184301 A1 | 12/2002 | Parent |
| 2003/0005030 A1 | 1/2003 | Sutton |
| 2003/0009552 A1 | 1/2003 | Benfield |
| 2003/0009553 A1 | 1/2003 | Benfield |
| 2003/0023839 A1 | 1/2003 | Burkhardt |
| 2003/0030548 A1 | 2/2003 | Kovacs |
| 2003/0038849 A1 | 2/2003 | Craven |
| 2003/0041137 A1 | 2/2003 | Horie |
| 2003/0041167 A1 | 2/2003 | French |
| 2003/0051009 A1 | 3/2003 | Shah |
| 2003/0052923 A1 | 3/2003 | Porter |
| 2003/0061344 A1 | 3/2003 | Monroe |
| 2003/0062997 A1 | 4/2003 | Naidoo |
| 2003/0065757 A1 | 4/2003 | Mentze |
| 2003/0071724 A1 | 4/2003 | D'Amico |
| 2003/0090473 A1 | 5/2003 | Joshi |
| 2003/0103088 A1 | 6/2003 | Dresti |
| 2003/0115345 A1 | 6/2003 | Chien |
| 2003/0128115 A1 | 7/2003 | Giacopelli |
| 2003/0132018 A1 | 7/2003 | Okita |
| 2003/0137426 A1 | 7/2003 | Anthony |
| 2003/0147534 A1 | 8/2003 | Ablay |
| 2003/0158635 A1 | 8/2003 | Pillar |
| 2003/0159135 A1 | 8/2003 | Hiller |
| 2003/0174648 A1 | 9/2003 | Wang |
| 2003/0177236 A1 | 9/2003 | Goto |
| 2003/0182396 A1 | 9/2003 | Reich |
| 2003/0187920 A1 | 10/2003 | Redkar |
| 2003/0189509 A1 | 10/2003 | Hayes |
| 2003/0197847 A1 | 10/2003 | Shinoda |
| 2003/0200325 A1 | 10/2003 | Krishnaswamy |
| 2003/0201889 A1 | 10/2003 | Zulkowski |
| 2003/0210126 A1 | 11/2003 | Kanazawa |
| 2003/0217136 A1 | 11/2003 | Cho |
| 2003/0230934 A1 | 12/2003 | Cordelli |
| 2003/0236841 A1 | 12/2003 | Epshteyn |
| 2004/0003073 A1 | 1/2004 | Krzyzanowski et al. |
| 2004/0003241 A1 | 1/2004 | Sengodan |
| 2004/0015572 A1 | 1/2004 | Kang |
| 2004/0024851 A1 | 2/2004 | Naidoo |
| 2004/0037295 A1 | 2/2004 | Tanaka |
| 2004/0054789 A1 | 3/2004 | Breh |
| 2004/0086088 A1 | 5/2004 | Naidoo |
| 2004/0086090 A1 | 5/2004 | Naidoo |
| 2004/0086093 A1 | 5/2004 | Schranz |
| 2004/0103308 A1 | 5/2004 | Paller |
| 2004/0117330 A1 | 6/2004 | Ehlers |
| 2004/0117462 A1 | 6/2004 | Bodin |
| 2004/0117465 A1 | 6/2004 | Bodin |
| 2004/0123149 A1 | 6/2004 | Tyroler |
| 2004/0139227 A1 | 7/2004 | Takeda |
| 2004/0143749 A1 | 7/2004 | Tajalli |
| 2004/0155757 A1 | 8/2004 | Litwin |
| 2004/0162902 A1 | 8/2004 | Davis |
| 2004/0163073 A1 | 8/2004 | Krzyzanowski |
| 2004/0163118 A1 | 8/2004 | Mottur |
| 2004/0169288 A1 | 9/2004 | Hsieh |
| 2004/0177163 A1 | 9/2004 | Casey |
| 2004/0189460 A1 | 9/2004 | Heato |
| 2004/0189871 A1 | 9/2004 | Kurosawa |
| 2004/0196844 A1 | 10/2004 | Hagino |
| 2004/0199645 A1 | 10/2004 | Rouhi |
| 2004/0202351 A1 | 10/2004 | Park |
| 2004/0212503 A1 | 10/2004 | Stilp |
| 2004/0215694 A1 | 10/2004 | Podolsky |
| 2004/0215700 A1 | 10/2004 | Shenfield |
| 2004/0223605 A1 | 11/2004 | Donnelly |
| 2004/0243835 A1 | 12/2004 | Terzis |
| 2004/0243996 A1 | 12/2004 | Sheehy |
| 2004/0246339 A1 | 12/2004 | Ooshima |
| 2004/0249922 A1 | 12/2004 | Hackman |
| 2004/0257433 A1 | 12/2004 | Lia |
| 2004/0260407 A1 | 12/2004 | Wimsatt |
| 2004/0260427 A1 | 12/2004 | Wimsatt |
| 2004/0267937 A1 | 12/2004 | Klemets |
| 2005/0010866 A1 | 1/2005 | Humpleman |
| 2005/0015805 A1 | 1/2005 | Iwamura |
| 2005/0023858 A1 | 2/2005 | Bingle |
| 2005/0024203 A1 | 2/2005 | Wolfe |
| 2005/0038325 A1 | 2/2005 | Moll |
| 2005/0038326 A1 | 2/2005 | Mathur |
| 2005/0044061 A1 | 2/2005 | Klemow |
| 2005/0052831 A1 | 3/2005 | Chen |
| 2005/0060411 A1 | 3/2005 | Coulombe |
| 2005/0066045 A1 | 3/2005 | Johnson |
| 2005/0069098 A1 | 3/2005 | Kalervo |
| 2005/0079855 A1 | 4/2005 | Jethi |
| 2005/0086126 A1 | 4/2005 | Patterson |
| 2005/0086211 A1 | 4/2005 | Mayer |
| 2005/0091696 A1 | 4/2005 | Wolfe |
| 2005/0096753 A1 | 5/2005 | Arling |
| 2005/0102152 A1 | 5/2005 | Hodges |
| 2005/0108091 A1 | 5/2005 | Sotak |
| 2005/0108369 A1 | 5/2005 | Sather |
| 2005/0120082 A1 | 6/2005 | Hesselink |
| 2005/0125083 A1 | 6/2005 | Kiko |
| 2005/0128068 A1 | 6/2005 | Winick |
| 2005/0128083 A1 | 6/2005 | Puzio |
| 2005/0144312 A1 | 6/2005 | Kadyk |
| 2005/0149639 A1 | 7/2005 | Vrielink |
| 2005/0149746 A1 | 7/2005 | Lu |
| 2005/0156568 A1 | 7/2005 | Yueh |
| 2005/0159823 A1 | 7/2005 | Hayes |
| 2005/0169288 A1 | 8/2005 | Kamiwada |
| 2005/0184865 A1 | 8/2005 | Han |
| 2005/0197847 A1 | 9/2005 | Smith |
| 2005/0200474 A1 | 9/2005 | Behnke |
| 2005/0204076 A1 | 9/2005 | Cumpson |
| 2005/0210532 A1 | 9/2005 | Winick |
| 2005/0216302 A1 | 9/2005 | Raji |
| 2005/0216580 A1 | 9/2005 | Raji |
| 2005/0222820 A1 | 10/2005 | Chung |
| 2005/0225442 A1 | 10/2005 | Kanayanna |
| 2005/0231349 A1 | 10/2005 | Bhat |

(56) References Cited

U.S. PATENT DOCUMENTS

| | | |
|---|---|---|
| 2005/0237182 A1 | 10/2005 | Wang |
| 2005/0249199 A1 | 11/2005 | Albert |
| 2005/0256608 A1 | 11/2005 | King |
| 2005/0267605 A1 | 12/2005 | Lee |
| 2005/0273831 A1 | 12/2005 | Slomovich |
| 2005/0276389 A1 | 12/2005 | Hinkson |
| 2005/0280964 A1 | 12/2005 | Richmond |
| 2006/0009863 A1 | 1/2006 | Lingemann |
| 2006/0010078 A1 | 1/2006 | Rezvani |
| 2006/0018328 A1 | 1/2006 | Mody |
| 2006/0045074 A1 | 3/2006 | Lee |
| 2006/0051122 A1 | 3/2006 | Kawazu |
| 2006/0063534 A1 | 3/2006 | Kokkonen |
| 2006/0064305 A1 | 3/2006 | Alonso |
| 2006/0064478 A1 | 3/2006 | Sirkin |
| 2006/0067344 A1 | 3/2006 | Sakurai |
| 2006/0067484 A1 | 3/2006 | Elliot |
| 2006/0075235 A1 | 4/2006 | Renkis |
| 2006/0078344 A1 | 4/2006 | Kawazu |
| 2006/0088092 A1 | 4/2006 | Chen |
| 2006/0098168 A1 | 5/2006 | McDowall et al. |
| 2006/0105713 A1 | 5/2006 | Zhen |
| 2006/0109113 A1 | 5/2006 | Reyes |
| 2006/0111095 A1 | 5/2006 | Weigand |
| 2006/0129837 A1 | 6/2006 | Im |
| 2006/0132302 A1 | 6/2006 | Stilp |
| 2006/0142880 A1 | 6/2006 | Deen |
| 2006/0142968 A1 | 6/2006 | Han |
| 2006/0143268 A1 | 6/2006 | Chatani |
| 2006/0145842 A1 | 7/2006 | Stil |
| 2006/0161270 A1 | 7/2006 | Luskin |
| 2006/0161662 A1 | 7/2006 | Ng |
| 2006/0161960 A1 | 7/2006 | Benoit |
| 2006/0167784 A1 | 7/2006 | Hoffberg |
| 2006/0168178 A1 | 7/2006 | Hwang |
| 2006/0181406 A1 | 8/2006 | Petite |
| 2006/0182100 A1 | 8/2006 | Li |
| 2006/0183460 A1 | 8/2006 | Srinivasan et al. |
| 2006/0187900 A1 | 8/2006 | Akbar |
| 2006/0190458 A1 | 8/2006 | Mishina |
| 2006/0197660 A1 | 9/2006 | Luebke |
| 2006/0200845 A1 | 9/2006 | Foster |
| 2006/0206220 A1 | 9/2006 | Amundson |
| 2006/0209857 A1 | 9/2006 | Hicks |
| 2006/0218593 A1 | 9/2006 | Afshary |
| 2006/0220830 A1 | 10/2006 | Bennett |
| 2006/0222153 A1 | 10/2006 | Tarkoff |
| 2006/0229746 A1 | 10/2006 | Ollis |
| 2006/0230270 A1 | 10/2006 | Goffin |
| 2006/0242395 A1 | 10/2006 | Fausak |
| 2006/0245369 A1 | 11/2006 | Schimmelpfeng |
| 2006/0246919 A1 | 11/2006 | Park |
| 2006/0258342 A1 | 11/2006 | Fok |
| 2006/0265489 A1 | 11/2006 | Moore |
| 2006/0271695 A1 | 11/2006 | Lavian |
| 2006/0282886 A1 | 12/2006 | Gaug |
| 2007/0002833 A1 | 1/2007 | Bajic |
| 2007/0005736 A1 | 1/2007 | Hansen |
| 2007/0005957 A1 | 1/2007 | Sahita |
| 2007/0006177 A1 | 1/2007 | Aiber |
| 2007/0052675 A1 | 3/2007 | Chang |
| 2007/0055770 A1 | 3/2007 | Karmakar |
| 2007/0061266 A1 | 3/2007 | Moore |
| 2007/0063866 A1 | 3/2007 | Webb |
| 2007/0079151 A1 | 4/2007 | Connor |
| 2007/0079385 A1 | 4/2007 | Williams |
| 2007/0096981 A1 | 5/2007 | Abraham |
| 2007/0101345 A1 | 5/2007 | Takagi |
| 2007/0106124 A1 | 5/2007 | Kuriyama |
| 2007/0130286 A1 | 6/2007 | Hopmann |
| 2007/0142022 A1 | 6/2007 | Madonna |
| 2007/0143440 A1 | 6/2007 | Reckamp |
| 2007/0146484 A1 | 6/2007 | Horton |
| 2007/0147419 A1 | 6/2007 | Tsujimoto |
| 2007/0155325 A1 | 7/2007 | Bambic |
| 2007/0160017 A1 | 7/2007 | Meier et al. |
| 2007/0162228 A1 | 7/2007 | Mitchell |
| 2007/0162680 A1 | 7/2007 | Mitchell |
| 2007/0192486 A1 | 8/2007 | Wilson |
| 2007/0198698 A1 | 8/2007 | Boyd |
| 2007/0216783 A1 | 9/2007 | Ortiz |
| 2007/0223465 A1 | 9/2007 | Wang |
| 2007/0226182 A1 | 9/2007 | Sobotka |
| 2007/0230415 A1 | 10/2007 | Malik |
| 2007/0236595 A1 | 10/2007 | Pan et al. |
| 2007/0245223 A1 | 10/2007 | Siedzik |
| 2007/0256105 A1 | 11/2007 | Tabe |
| 2007/0265866 A1 | 11/2007 | Fehling |
| 2007/0271398 A1 | 11/2007 | Manchester |
| 2007/0286210 A1 | 12/2007 | Gutt |
| 2007/0286369 A1 | 12/2007 | Gutt |
| 2007/0287405 A1 | 12/2007 | Radtke |
| 2007/0288849 A1 | 12/2007 | Moorer |
| 2007/0290830 A1 | 12/2007 | Gurley |
| 2007/0298772 A1 | 12/2007 | Owens |
| 2008/0001734 A1 | 1/2008 | Stilp |
| 2008/0013957 A1 | 1/2008 | Akers |
| 2008/0027587 A1 | 1/2008 | Nickerson |
| 2008/0042826 A1 | 2/2008 | Hevia |
| 2008/0048975 A1 | 2/2008 | Leibow |
| 2008/0057929 A1* | 3/2008 | Min .................. H04M 11/007 455/418 |
| 2008/0065681 A1 | 3/2008 | Fontijn |
| 2008/0072244 A1 | 3/2008 | Eker |
| 2008/0084296 A1 | 4/2008 | Kutzik |
| 2008/0091793 A1 | 4/2008 | Diroo |
| 2008/0104516 A1 | 5/2008 | Lee |
| 2008/0109650 A1 | 5/2008 | Shim |
| 2008/0112405 A1 | 5/2008 | Cholas |
| 2008/0117029 A1 | 5/2008 | Dohrmann |
| 2008/0126535 A1 | 5/2008 | Zhu |
| 2008/0133725 A1 | 6/2008 | Shaouy |
| 2008/0141303 A1 | 6/2008 | Walker |
| 2008/0141341 A1 | 6/2008 | Vinogradov |
| 2008/0147834 A1 | 6/2008 | Quinn |
| 2008/0163355 A1 | 7/2008 | Chu |
| 2008/0168404 A1 | 7/2008 | Ording |
| 2008/0170511 A1 | 7/2008 | Shorty |
| 2008/0180240 A1 | 7/2008 | Raji |
| 2008/0183842 A1 | 7/2008 | Raji |
| 2008/0189609 A1 | 8/2008 | Larson |
| 2008/0209506 A1* | 8/2008 | Ghai ..................... G06Q 10/06 726/1 |
| 2008/0211683 A1* | 9/2008 | Curt ........................ H02H 5/10 340/652 |
| 2008/0219239 A1 | 9/2008 | Bell |
| 2008/0235326 A1 | 9/2008 | Parsi |
| 2008/0235600 A1 | 9/2008 | Harper |
| 2008/0240372 A1 | 10/2008 | Frenette |
| 2008/0253391 A1 | 10/2008 | Krits |
| 2008/0261540 A1 | 10/2008 | Rohani |
| 2008/0284587 A1 | 11/2008 | Saigh |
| 2008/0316024 A1 | 12/2008 | Chantelou |
| 2009/0019141 A1 | 1/2009 | Bush |
| 2009/0036142 A1 | 2/2009 | Yan |
| 2009/0041467 A1 | 2/2009 | Carleton |
| 2009/0042649 A1 | 2/2009 | Hsieh |
| 2009/0049488 A1 | 2/2009 | Stransky |
| 2009/0063582 A1 | 3/2009 | Anna |
| 2009/0066788 A1 | 3/2009 | Baum |
| 2009/0066789 A1 | 3/2009 | Baum |
| 2009/0067395 A1 | 3/2009 | Curtis |
| 2009/0070436 A1 | 3/2009 | Dawes |
| 2009/0070473 A1 | 3/2009 | Baum |
| 2009/0070477 A1 | 3/2009 | Baum |
| 2009/0070681 A1 | 3/2009 | Dawes |
| 2009/0070682 A1 | 3/2009 | Dawes |
| 2009/0070692 A1 | 3/2009 | Dawes |
| 2009/0074184 A1 | 3/2009 | Baum |
| 2009/0077167 A1 | 3/2009 | Baum |
| 2009/0077622 A1 | 3/2009 | Baum |
| 2009/0077623 A1 | 3/2009 | Baum |
| 2009/0077624 A1 | 3/2009 | Baum |
| 2009/0100329 A1 | 4/2009 | Espinoza |

(56) References Cited

U.S. PATENT DOCUMENTS

| | | |
|---|---|---|
| 2009/0100492 A1 | 4/2009 | Hicks |
| 2009/0113344 A1 | 4/2009 | Nesse |
| 2009/0119397 A1 | 5/2009 | Neerdaels |
| 2009/0125708 A1 | 5/2009 | Woodring |
| 2009/0128365 A1 | 5/2009 | Laskin |
| 2009/0134998 A1 | 5/2009 | Baum |
| 2009/0138600 A1 | 5/2009 | Baum |
| 2009/0138958 A1 | 5/2009 | Baum |
| 2009/0146846 A1 | 6/2009 | Grossman |
| 2009/0158189 A1 | 6/2009 | Itani |
| 2009/0158292 A1 | 6/2009 | Rattner |
| 2009/0165114 A1 | 6/2009 | Baum |
| 2009/0177906 A1 | 7/2009 | Paniagua |
| 2009/0204693 A1 | 8/2009 | Andreev |
| 2009/0221368 A1 | 9/2009 | Yen |
| 2009/0240787 A1 | 9/2009 | Denny |
| 2009/0240814 A1 | 9/2009 | Brubacher |
| 2009/0240946 A1 | 9/2009 | Yeap |
| 2009/0256708 A1 | 10/2009 | Hsiao |
| 2009/0265042 A1 | 10/2009 | Mollenkopf et al. |
| 2009/0303100 A1 | 12/2009 | Zemany |
| 2009/0313693 A1 | 12/2009 | Rogers |
| 2009/0322510 A1 | 12/2009 | Berger |
| 2010/0008274 A1 | 1/2010 | Kneckt |
| 2010/0023865 A1 | 1/2010 | Fulker |
| 2010/0026487 A1 | 2/2010 | Hershkovitz |
| 2010/0026802 A1 | 2/2010 | Titus et al. |
| 2010/0030578 A1 | 2/2010 | Siddique |
| 2010/0030810 A1 | 2/2010 | Marr |
| 2010/0052612 A1 | 3/2010 | Raji |
| 2010/0066530 A1 | 3/2010 | Cohn |
| 2010/0074112 A1 | 3/2010 | Derr |
| 2010/0077111 A1 | 3/2010 | Holmes |
| 2010/0082744 A1 | 4/2010 | Raji |
| 2010/0095111 A1 | 4/2010 | Gutt |
| 2010/0095369 A1 | 4/2010 | Gutt |
| 2010/0121521 A1 | 5/2010 | Kiribayashi |
| 2010/0124228 A1 | 5/2010 | Tinnakornsrisuphap et al. |
| 2010/0153853 A1 | 6/2010 | Dawes |
| 2010/0159967 A1 | 6/2010 | Pounds |
| 2010/0155857 A1 | 7/2010 | Neitzel |
| 2010/0197219 A1 | 8/2010 | Issa |
| 2010/0210240 A1 | 8/2010 | Mahaffey |
| 2010/0212012 A1 | 8/2010 | Touboul |
| 2010/0218104 A1 | 8/2010 | Lewis |
| 2010/0245107 A1 | 9/2010 | Fulker |
| 2010/0267390 A1 | 10/2010 | Lin |
| 2010/0280635 A1 | 11/2010 | Cohn |
| 2010/0280637 A1 | 11/2010 | Cohn |
| 2010/0298024 A1 | 11/2010 | Choi |
| 2010/0321151 A1 | 12/2010 | Matsuura |
| 2010/0332164 A1 | 12/2010 | Aisa |
| 2011/0000521 A1 | 1/2011 | Tachibana |
| 2011/0029875 A1 | 2/2011 | Milch |
| 2011/0040415 A1 | 2/2011 | Nickerson |
| 2011/0040877 A1 | 2/2011 | Foisy |
| 2011/0087988 A1 | 4/2011 | Ray et al. |
| 2011/0096678 A1 | 4/2011 | Ketonen |
| 2011/0102588 A1 | 5/2011 | Trundle |
| 2011/0197327 A1 | 8/2011 | McElroy |
| 2011/0234392 A1 | 9/2011 | Cohn |
| 2011/0283006 A1 | 11/2011 | Ramamurthy |
| 2011/0286437 A1 | 11/2011 | Austin et al. |
| 2012/0023151 A1 | 1/2012 | Bennett, III |
| 2012/0066608 A1 | 3/2012 | Sundermeyer |
| 2012/0081842 A1 | 4/2012 | Ewing |
| 2012/0150966 A1 | 6/2012 | Fan et al. |
| 2012/0154138 A1 | 6/2012 | Cohn |
| 2012/0182245 A1 | 7/2012 | Hutton |
| 2012/0242788 A1 | 9/2012 | Chuang |
| 2012/0260184 A1 | 10/2012 | Dawes |
| 2012/0278877 A1 | 11/2012 | Baum |
| 2012/0309354 A1 | 12/2012 | Du |
| 2012/0315848 A1 | 12/2012 | Smith et al. |
| 2012/0327242 A1 | 12/2012 | Barley |
| 2013/0002880 A1 | 1/2013 | Levinson et al. |
| 2013/0120134 A1 | 5/2013 | Hicks, III |
| 2013/0121239 A1 | 5/2013 | Hicks, III |
| 2013/0136102 A1 | 5/2013 | Macwan et al. |
| 2013/0174239 A1 | 7/2013 | Kim et al. |
| 2013/0223279 A1 | 8/2013 | Tinnakomsrisuphap et al. |
| 2013/0258047 A1 | 10/2013 | Morimoto et al. |
| 2014/0143695 A1 | 5/2014 | Sundermeyer |
| 2014/0143854 A1 | 5/2014 | Lopez |
| 2014/0153695 A1 | 6/2014 | Yanagisawa |
| 2014/0369584 A1 | 12/2014 | Fan et al. |
| 2015/0009325 A1 | 1/2015 | Kardashov |
| 2015/0088982 A1 | 3/2015 | Johnson |
| 2015/0097949 A1 | 4/2015 | Ure et al. |
| 2015/0142991 A1 | 5/2015 | Zaloom |

FOREIGN PATENT DOCUMENTS

| | | |
|---|---|---|
| AU | 2011250886 | 1/2013 |
| AU | 2011305163 | 5/2013 |
| CA | 2559842 | 5/2014 |
| EP | 0295146 | 12/1988 |
| EP | 0308046 | 3/1989 |
| EP | 0591585 | 4/1994 |
| EP | 0978111 | 11/2001 |
| EP | 2112784 | 10/2009 |
| FR | 2584217 | 1/1987 |
| FR | 2661023 | 10/1991 |
| FR | 2793334 | 11/2000 |
| GB | 2222288 | 2/1990 |
| GB | 2273593 | 6/1994 |
| GB | 2319373 | 5/1998 |
| GB | 2324630 | 10/1998 |
| GB | 2335523 | 9/1999 |
| GB | 2349293 | 10/2000 |
| GB | 2370400 | 6/2002 |
| JP | 8227491 | 9/1996 |
| JP | 2002055895 | 2/2002 |
| JP | 2003085258 | 3/2003 |
| JP | 2003141659 | 5/2003 |
| JP | 2004192659 | 7/2004 |
| KR | 20060021605 | 3/2006 |
| WO | WO 8907855 | 8/1989 |
| WO | WO 9403881 | 2/1994 |
| WO | WO 9636301 | 11/1996 |
| WO | WO 9849663 | 11/1998 |
| WO | WO 9934339 | 7/1999 |
| WO | WO 0152478 | 7/2001 |
| WO | WO 0199078 | 12/2001 |
| WO | WO 0221300 | 3/2002 |
| WO | WO 02097584 | 12/2002 |
| WO | WO 03040839 | 5/2003 |
| WO | WO 2004004222 | 1/2004 |
| WO | WO 2004098127 | 11/2004 |
| WO | WO 2004107710 | 12/2004 |
| WO | WO 2005091218 | 9/2005 |
| WO | WO 2005091218 | 7/2006 |
| WO | WO 2007038872 | 4/2007 |
| WO | WO 2007124453 | 11/2007 |
| WO | WO 2009006670 | 1/2009 |
| WO | WO 2009145747 | 12/2009 |
| WO | WO 2011060385 | 5/2011 |
| WO | WO 2013/051916 | 4/2013 |

OTHER PUBLICATIONS

Co-pending U.S. Appl. No. 11/761,745, filed Jun. 12, 2007.
Co-pending U.S. Appl. No. 12/019,568, filed Jan. 24, 2008.
Co-pending U.S. Appl. No. 12/189,780, filed Aug. 11, 2008.
Co-pending U.S. Appl. No. 12/189,785, filed Aug. 11, 2008.
Co-pending U.S. Appl. No. 12/197,931, filed Aug. 25, 2008.
Co-pending U.S. Appl. No. 12/197,946, filed Aug. 25, 2008.
Co-pending U.S. Appl. No. 12/197,958, filed Aug. 25, 2008.
Co-pending U.S. Appl. No. 12/198,039, filed Aug. 25, 2008.
Co-pending U.S. Appl. No. 12/198,051, filed Aug. 25, 2008.
Co-pending U.S. Appl. No. 12/198,060, filed May 28, 2008.
Co-pending U.S. Appl. No. 12/198,066, filed Aug. 25, 2008.

(56) References Cited

OTHER PUBLICATIONS

Co-pending U.S. Appl. No. 12/269,735, filed Nov. 12, 2008.
Co-pending U.S. Appl. No. 12/539,537, filed Aug. 11, 2009.
Co-pending U.S. Appl. No. 12/568,718, filed Sep. 29, 2009.
Co-pending U.S. Appl. No. 12/630,092, filed Dec. 3, 2009.
Co-pending U.S. Appl. No. 12/691,992, filed Jan. 22, 2010.
Co-pending U.S. Appl. No. 12/718,385, filed Mar. 5, 2010.
Co-pending U.S. Appl. No. 12/732,879, filed Mar. 26, 2010.
Co-pending U.S. Appl. No. 12/750,470, filed Mar. 30, 2010.
Co-pending U.S. Appl. No. 12/770,253, filed Apr. 29, 2010.
Co-pending U.S. Appl. No. 12/770,365, filed Apr. 29, 2010.
Co-pending U.S. Appl. No. 12/771,071, filed Apr. 30, 2010.
Co-pending U.S. Appl. No. 12/771,372, filed Apr. 30, 2010.
Co-pending U.S. Appl. No. 12/771,471, filed Apr. 30, 2010.
Co-pending U.S. Appl. No. 12/771,624, filed Apr. 30, 2010.
Co-pending U.S. Appl. No. 12/892,303, filed Sep. 28, 2010.
Co-pending U.S. Appl. No. 12/892,801, filed Sep. 28, 2010.
Co-pending U.S. Appl. No. 12/952,080, filed Nov. 22, 2010.
Co-pending U.S. Appl. No. 12/970,313, filed Dec. 16, 2010.
Co-pending U.S. Appl. No. 12/971,282, filed Dec. 17, 2010.
Co-pending U.S. Appl. No. 12/972,740, filed Dec. 20, 2010.
Co-pending U.S. Appl. No. 13/099,293, filed May 2, 2011.
Co-pending U.S. Appl. No. 13/104,932, filed May 10, 2011.
Co-pending U.S. Appl. No. 13/104,936, filed May 10, 2011.
Co-pending U.S. Appl. No. 13/153,807, filed Jun. 6, 2011.
Co-pending U.S. Appl. No. 13/244,008, filed Sep. 23, 2011.
Co-pending U.S. Appl. No. 13/311,365, filed Dec. 5, 2011.
Co-pending U.S. Appl. No. 13/334,998, filed Dec. 22, 2011.
Co-pending U.S. Appl. No. 13/335,279, filed Dec. 22, 2011.
Co-pending U.S. Appl. No. 13/400,477, filed Dec. 22, 2011.
Co-pending U.S. Appl. No. 13/406,264, filed Feb. 27, 2012.
Co-pending U.S. Appl. No. 13/486,276, filed Jun. 1, 2012.
Co-pending U.S. Appl. No. 13/531,757, filed Jun. 25, 2012.
Co-pending U.S. Appl. No. 13/718,851, filed Dec. 18, 2012.
Co-pending U.S. Appl. No. 13/725,607, filed Dec. 21, 2012.
Co-pending U.S. Appl. No. 13/925,181, filed Jun. 24, 2013.
Co-pending U.S. Appl. No. 13/929,568, filed Jun. 27, 2013.
Co-pending U.S. Appl. No. 13/932,816, filed Jul. 1, 2013.
Co-pending U.S. Appl. No. 13/932,837, filed Jul. 1, 2013.
Co-pending U.S. Appl. No. 29/419,628, filed Apr. 30, 2012.
Co-pending U.S. Appl. No. 29/420,377, filed May 8, 2012.
Final Office Action dated Jul. 12, 2010 for U.S. Appl. No. 12/019,554, filed Jan. 24, 2008.
Final Office Action dated Oct. 17, 2012 for U.S. Appl. No. 12/637,671, filed Dec. 14, 2009.
Non-Final Office Action dated Jan. 5, 2010 for U.S. Appl. No. 12/019,554, filed Jan. 24, 2008.
Non-Final Office Action dated May 5, 2010 for U.S. Appl. No. 12/189,780, filed Aug. 11, 2008.
Non-Final Office Action dated May 5, 2010 for U.S. Appl. No. 12/189,785, filed Aug. 11, 2008.
Non-Final Office Action dated Feb. 7, 2012 for U.S. Appl. No. 12/637,671, filed Dec. 14, 2009.
Non-Final Office Action dated Feb. 7, 2013 for U.S. Appl. No. 12/970,313, filed Dec. 16, 2010.
Non-Final Office Action dated Feb. 8, 2012 for U.S. Appl. No. 12/630,092, filed Dec. 3, 2009.
Non-Final Office Action dated Apr. 9, 2012 for U.S. Appl. No. 12/771,624, filed Apr. 30, 2010.
Non-Final Office Action dated Dec. 9, 2008 for U.S. Appl. No. 11/084,232, filed Mar. 16, 2005.
Non-Final Office Action dated Aug. 10, 2012 for U.S. Appl. No. 12/771,471, filed Apr. 30, 2010.
Non-Final Office Action dated Oct. 11, 2012 for U.S. Appl. No. 12/019,568, filed Jan. 24, 2008.
Non-Final Office Action dated Apr. 12, 2012 for U.S. Appl. No. 12/770,365, filed Apr. 29, 2010.
Non-Final Office Action dated Jul. 12, 2012 for U.S. Appl. No. 12/691,992, filed Jan. 22, 2010.
Non-Final Office Action dated Oct. 12, 2012 for U.S. Appl. No. 12/630,092, filed Dec. 3, 2009.
Non-Final Office Action dated Sep. 12, 2012 for U.S. Appl. No. 12/952,080, filed Nov. 22, 2010.
Non-Final Office Action dated Apr. 13, 2010 for U.S. Appl. No. 11/761,745, filed Jun. 12, 2007.
Non-Final Office Action dated Jul. 13, 2010 for U.S. Appl. No. 12/019,568, filed Jan. 24, 2008.
Non-Final Office Action dated Nov. 14, 2012 for U.S. Appl. No. 13/531,757, filed Jun. 25, 2012.
Non-Final Office Action dated Sep. 14, 2010 for U.S. Appl. No. 11/084,232, filed Mar. 16, 2005.
Non-Final Office Action dated Sep. 16, 2011 for U.S. Appl. No. 12/539,537, filed Aug. 11, 2009.
Non-Final Office Action dated Sep. 17, 2012 for U.S. Appl. No. 12/189,780, filed Aug. 11, 2008.
Non-Final Office Action dated Aug. 18, 2011 for U.S. Appl. No. 12/197,958, filed Aug. 25, 2008.
Non-Final Office Action dated Feb. 18, 2011 for U.S. Appl. No. 12/630,092, filed Dec. 3, 2009.
Non-Final Office Action dated Jan. 18, 2012 for U.S. Appl. No. 12/771,071, filed Apr. 30, 2010.
Non-Final Office Action dated Feb. 21, 2013 for U.S. Appl. No. 12/771,372, filed Apr. 30, 2010.
Non-Final Office Action dated Jul. 21, 2010 for U.S. Appl. No. 12/630,092, filed Dec. 3, 2009.
Non-Final Office Action dated Dec. 22, 2010 for U.S. Appl. No. 12/197,931, filed Aug. 25, 2008.
Non-Final Office Action dated Jul. 22, 2013 for U.S. Appl. No. 12/630,092, filed Dec. 3, 2009.
Non-Final Office Action dated May 23, 2013 for U.S. Appl. No. 13/104,932, filed 1 O May 2011.
Non-Final Office Action dated May 23, 2013 for U.S. Appl. No. 13/104,936, filed 1 O May 2011.
Non-Final Office Action dated Jan. 26, 2012 for U.S. Appl. No. 12/019,568, filed Jan. 24, 2008.
Non-Final Office Action dated Nov. 26, 2010 for U.S. Appl. No. 12/197,958, filed Aug. 25, 2008.
Non-Final Office Action dated Jun. 27, 2013 for U.S. Appl. No. 12/019,568, filed Jan. 24, 2008.
Non-Final Office Action dated Dec. 30, 2009 for U.S. Appl. No. 11/084,232, filed Mar. 16, 2005.
Non-Final Office Action dated May 30, 2008 for U.S. Appl. No. 11/084,232, filed Mar. 16, 2005.
Non-Final Office Action issued in U.S. Appl. No. 14/456,377, dated May 30, 2019, 16 pages.
Notice of Allowance dated May 14, 2013 for U.S. Appl. No. 12/637,671, filed Dec. 14, 2009.
Notice of Allowance dated Oct. 25, 2012 for U.S. Appl. No. 11/084,232, filed Mar. 16, 2005.
Requirement for Restriction/Election dated Jan. 22, 2013 for U.S. Appl. No. 13/104,932, filed May 10, 2011.
Requirement for Restriction/Election dated Jan. 22, 2013 for U.S. Appl. No. 13/104,936, filed May 10, 2011.
Requirement for Restriction/Election dated Oct. 24, 2012 for U.S. Appl. No. 12/750,470, filed Mar. 30, 2010.
Alarm.com—Interactive Security Systems, Elders [retrieved on Nov. 4, 2003], 1 page.
Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
Australian Patent App. No. 2010297957.
Australian Patent App. No. 2011250886.
Australian Patent App. No. 2011305163.
Canadian Patent App. No. 2559842.
Chinese Patent App. No. 201080053845.7.
Chinese Patent App. No. 201180034090.0.
EP Examination Report in European Application No. 14833805.6, dated Jan. 14, 2019, 5 pages.
European Patent App. No. 05725743.8.

(56) References Cited

OTHER PUBLICATIONS

European Patent App. No. 08797646.0.
European Patent App. No. 08828613.3.
European Patent App. No. 09807196.2.
European Patent App. No. 10819658.5.
European Patent App. No. 11781184.4.
European Patent App. No. 11827671.6.
Examination Report under Section 18(3) re for UK Patent Application No. GB0620362.4, dated Aug. 13, 2007.
Examination Report under Section 18(3) re for UK Patent Application No. GB0724248.0, dated Jun. 4, 2008.
Examination Report under Section 18(3) re for UK Patent Application No. GB0724248.0, dated Jan. 30, 2008.
Examination Report under Section 18(3) re for UK Patent Application No. GB0724 760.4, dated Jan. 30, 2008.
Examination Report under Section 18(3) re for UK Patent Application No. GB0800040.8, dated Jan. 30, 2008.
Faultline, "AT&T Targets Video Home Security as Next Broadband Market," The Register, Nov. 2, 2006, 2 pages.
Final Office Action dated Aug. 1, 2011 for U.S. Appl. No. 12/630,092, filed Dec. 3, 2009.
Final Office Action dated Jun. 1, 2009 for U.S. Appl. No. 11/084,232, filed Mar. 16, 2005.
Final Office Action dated Jun. 5, 2012 for U.S. Appl. No. 12/771,071, filed Apr. 30, 2010.
Final Office Action dated May 9, 2013 for U.S. Appl. No. 12/189,780, filed Aug. 11, 2008.
Final Office Action dated May 9, 2013 for U.S. Appl. No. 12/952,080, filed Nov. 22, 2010.
Final Office Action dated Jan. 10, 2011 for U.S. Appl. No. 12/189,785, filed Aug. 11, 2008.
Final Office Action dated Jun. 10, 2011 for U.S. Appl. No. 11/084,232, filed Mar. 16, 2005.
Final Office Action dated Jul. 12, 2010 for U.S. Application No. 12/019,554, filed Jan. 24, 2008.
Final Office Action dated Jan. 13, 2011 for U.S. Appl. No. 12/189,780, filed Aug. 11, 2008.
Final Office Action dated Sep. 14, 2011 for U.S. Appl. No. 12/197,931, filed Aug. 25, 2008.
Final Office Action dated Feb. 16, 2011 for U.S. Appl. No. 12/019,568, filed Jan. 24, 2008.
Final Office Action dated Oct. 17, 2012 for U.S. Appl. No. 12/637,671, filed Dec. 4, 2009.
Final Office Action dated Sep. 17, 2012 for U.S. Appl. No. 12/197,958, filed Aug. 25, 2008.
Final Office Action dated Mar. 21, 2013 for U.S. Appl. No. 12/691,992, filed Jan. 22, 2010.
Final Office Action dated Jul. 23, 2013 for U.S. Appl. No. 13/531,757, filed Jun. 25, 2012.
Final Office Action dated Feb. 26, 2013 for U.S. Appl. No. 12/771,471, filed Apr. 30, 2010.
Final Office Action dated Jun. 29, 2012 for U.S. Appl. No. 12/539,537, filed Aug. 11, 2009.
Final Office Action dated Dec. 31, 2012 for U.S. Appl. No. 12/770,365, filed Apr. 29, 2010.
Final Office Action dated Oct. 31, 2012 for U.S. Appl. No. 12/771,624, filed Apr. 30, 2010.
Final Office Action in U.S. Appl. No. 14/456,377, dated Jan. 7, 2020, 18 pages.
Form PCT/ISA/210, "PCT International Search Report for the Application No. PCT/US05/08766," dated May 23, 2006, 2 pages.
Form PCT/ISA/210, "PCT International Search Report for the Application No. PCT/US08/72831," dated Nov. 4, 2008, 2 pages.
Form PCT/ISA/210, "PCT International Search Report for the Application No. PCT/US08/74246," dated Nov. 14, 2008, 2 pages.
Form PCT/ISA/210, "PCT International Search Report for the Application No. PCT/US08/74260," dated Nov. 13, 2008, 2 pages.
Form PCT/ISA/210, "PCT International Search Report for the Application No. PCT/US09/53485," dated Oct. 22, 2009, 2 pages.
Form PCT/ISA/210, "PCT International Search Report for the Application No. PCT/US09/55559," dated Nov. 12, 2009, 2 pages.
Form PCT/ISA/210, "PCT International Search Report for the Application No. PCT/US10/50585," dated Dec. 30, 2010, 2 pages.
Form PCT/ISA/210, "PCT International Search Report for the Application No. PCT/US10/57674," dated Mar. 2, 2011, 2 pages.
Form PCT/ISA/210, "PCT International Search Report for the Application No. PCT/US11/34858," dated Oct. 3, 2011, 2 pages.
Form PCT/ISA/210, "PCT International Search Report for the Application No. PCT/US11/35994," dated Sep. 28, 2011, 2 pages.
Form PCT/ISA/210, "PCT International Search Report for the Application No. PCT/US11/53136," dated Jan. 5, 2012, 2 pages.
Form PCT/ISA/210, "PCT International Search Report of the Application No. PCT/US08/83254," dated Jan. 14, 2009, 2 pages.
Form PCT/ISA/220, "PCT Notification of Transmittal of The International Search Report and the Written Opinion of the International Searching Authority, or the Declaration," 1 pg.
Form PCT/ISA/220, "PCT Notification of Transmittal of the International Search Report and the Written Opinion of the International Searching Authority, or the Declaration for the Application No. PCT/US05/08766," dated May 23, 2006, 1 page.
Form PCT/ISA/220, "PCT Notification of Transmittal of the International Search Report and the Written Opinion of the International Searching Authority, or the Declaration for the Application No. PCT/US08/72831," dated Nov. 4, 2008, 1 page.
Form PCT/ISA/220, "PCT Notification of Transmittal of the International Search Report and the Written Opinion of the International Searching Authority, or the Declaration for the Application No. PCT/US08/74246" dated Nov. 14, 2008, 1 page.
Form PCT/ISA/220, "PCT Notification of Transmittal of the International Search Report and the Written Opinion of the International Searching Authority, or the Declaration for the Application No. PCT/US08/74260," dated Nov. 13, 2008, 1 page.
Form PCT/ISA/220, "PCT Notification of Transmittal of the International Search Report and the Written Opinion of the International Searching Authority, or the Declaration for the Application No. PCT/US09/53485," dated Oct. 22, 2009, 1 page.
Form PCT/ISA/220, "PCT Notification of Transmittal of the International Search Report and the Written Opinion of the International Searching Authority, or the Declaration for the Application No. PCT/US09/55559," dated Nov. 12, 2009, 1 page.
Form PCT/ISA/220, "PCT Notification of Transmittal of the International Search Report and the Written Opinion of the International Searching Authority, or the Declaration for the Application No. PCT/US10/50585," dated Dec. 30, 2010, 1 page.
Form PCT/ISA/220, "PCT Notification of Transmittal of the International Search Report and the Written Opinion of the International Searching Authority, or the Declaration for the Application No. PCT/US10/57674," dated Mar. 2, 2011, 1 page.
Form PCT/ISA/220, "PCT Notification of Transmittal of the International Search Report and the Written Opinion of the International Searching Authority, or the Declaration for the Application No. PCT/US11/35994," dated Sep. 28, 2011, 1 page.
Form PCT/ISA/220, "PCT Notification of Transmittal of the International Search Report and the Written Opinion of the International Searching Authority, or the Declaration of the Application No. PCT/US08/83254," dated Jan. 14, 2009, 1 page.
Form PCT/ISA/237," PCT Written Opinion of the International Searching Authority for the Application No. PCT/USOS/08766," dated May 23, 2006, 5 pages.
Form PCT/ISA/237, "PCT Written Opinion of the International Searching Authority," 6 pgs.
Form PCT/ISA/237, "PCT Written Opinion of the International Searching Authority for the Application No. PCT/US08/72831," dated Nov. 4, 2008, 6 pages.
Form PCT /ISA/237, "PCT Written Opinion of the International Searching Authority for the Application No. PCT/US08/74246," dated Nov. 14, 2008, 6 pages.
Form PCT/ISA/237, "PCT Written Opinion of the International Searching Authority for the Application No. PCT/US08/74260," dated Nov. 13, 2008, 6 pages.

(56) References Cited

OTHER PUBLICATIONS

Form PCT/ISA/237, "PCT Written Opinion of the International Searching Authority for the Application No. PCT/US09/53485," dated Oct. 22, 2009, 8 pages.
Form PCT/ISA/237, "PCT Written Opinion of the International Searching Authority for the Application No. PCT/US09/55559," dated Nov. 12, 2009, 6 pages.
Form PCT /ISA/237, "PCT Written Opinion of the International Searching Authority for the Application No. PCT/US10/50585," dated Dec. 30, 2010, 7 pages.
Form PCT/ISA/237, "PCT Written Opinion of the International Searching Authority for the Application No. PCT/US10/57674," dated Mar. 2, 2011, 6 pages.
Form PCT/ISA/237, "PCT Written Opinion of the International Searching Authority for the Application No. PCT/US11/34858," dated Oct. 3, 2011, 8 pages.
Form PCT/ISA/237, "PCT Written Opinion of the International Searching Authority for the Application No. PCT/US11/35994," dated Sep. 28, 2011, 11 pages.
Form PCT/ISA/237, "PCT Written Opinion of the International Searching Authority for the Application No. PCT/US11/53136," dated Jan. 5, 2012,.
Form PCT/ISA/237, "PCT Written Opinion ofthe International Searching Authority of the Application No. PCT/USOS/83254," dated Jan. 14, 2009, 7 pages.
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
Indian Patent App. No. 10698/DELNP/2012.
Indian Patent App. No. 3687/DELNP/2012.
International Patent Application No. PCT/US2013/048324.
International Search Report for Application No. PCT/US13/48324, dated Jan. 14, 2014, 2 pages.
International Search Report for Application No. PCT/US2014/050548, dated Mar. 18, 2015, 4 pages.
Lagotek Wireless Home Automation System, May 2006 [retrieved on Aug. 22, 2012], Non-.
Non-Final Office Action dated Apr. 4, 2013 for U.S. Appl. No. 12/197,931, filed Aug. 25, 2008.
Non-Final Office Action dated Mar. 4, 2013 for U.S. Appl. No. 13/400,477, filed Feb. 20, 2012.
South African Patent App. No. 2013/02668.
Supplemental European Search Report for Application No. EP05725743.8 dated Sep. 14, 2010, 2 pages.
Supplementary European Search Report for Application No. EP10819658, dated Mar. 10, 2015, 2 pages.
Supplementary European Search Report for Application No. EP11827671, dated Mar. 10, 2015, 2 pages.
Supplementary European Search Report for Application No. EP2191351, dated Jun. 23, 2014, 2 pages.
Supplementary Non-Final Office Action dated Oct. 28, 2010 for U.S. Appl. No. 12/630,092, filed Dec. 3, 2009.
Supplementary Partial European Search Report for Application No. EP09807196, dated Nov. 17, 2014, 5 pages.
Taiwanese Patent App. No. 99113848.
Taiwanese Patent App. No. 99113853.
Taiwanese Patent App. No. 99113855.
Taiwanese Patent App. No. 99113856.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United Kingdom Patent No. 2428821.
United Kingdom Patent No. 2442628.
United Kingdom Patent No. 2442633.
United Kingdom Patent No. 2442640.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.
European Office action in European Application No. EP 14833805, dated May 25, 2017, 10 pages.

\* cited by examiner

SYSTEM, METHOD AND APPARATUS FOR REMOTE MONITORING

RELATED APPLICATIONS

This application is a continuation of U.S. application Ser. No. 14/456,449, filed Aug. 11, 2014, now allowed, which claims the benefit of U.S. Provisional Application No. 61/864,248, filed Aug. 9, 2013. Both of these prior applications are incorporated by reference in their entirety.

TECHNICAL FIELD

The present disclosure relates to monitoring systems and in particular to a web-based integrated monitoring system for small spaces.

BACKGROUND

Home security and monitoring systems require professional installation and require professional management and monitoring. For small spaces such as apartments, the installation of a monitoring system is not practical due to the investment required to install the system and the on-going expense to monitor and maintain the monitoring system. In addition, in the rental apartment market, landlords do not want the additional expense of a monitoring system and renters do not want to install as system as they cannot take it with them. Existing solutions require multiple components to be installed and provide limited controllability and monitoring capability. Accordingly, an improved monitoring system remains highly desirable.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Embodiments of a monitoring system are described herein. The monitoring system is configured for use in smaller spaces, for example, but is not so limited. The architecture of the monitoring system includes numerous layers that operate in concert to provide security, notification, video streaming, and home automation functions, as described in detail herein.

Figure 1D:
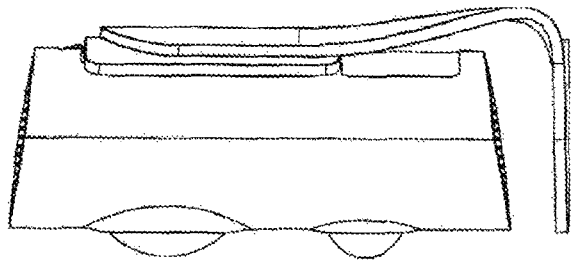
FIGS. 1A-1F show views of a monitoring unit, under an embodiment.
Figure 1F:
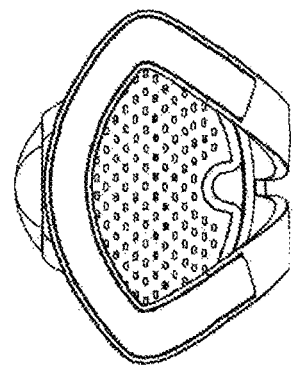
Figure 1C:
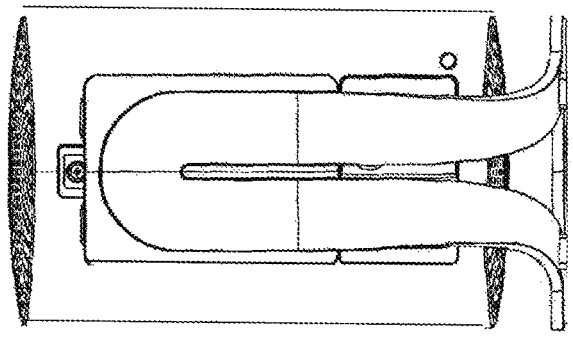
Figure 1E:
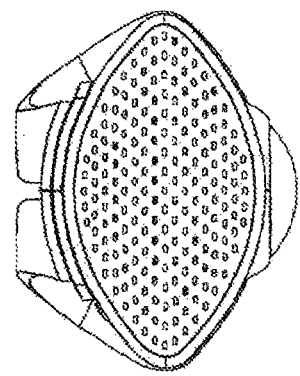
Figure 1B:
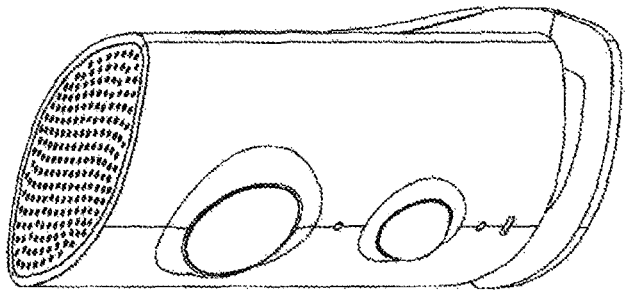
Figure 1A:
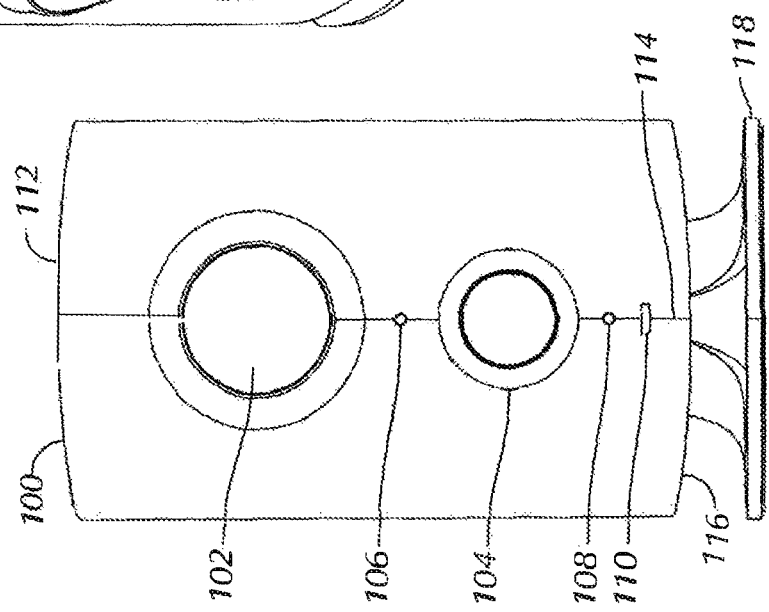

FIGS. 1A-1F show views of a monitoring unit 100, under an embodiment. FIG. 1A shows a front view of the monitoring unit 100. The monitoring unit 100 integrates multiple devices and/or operations into a compact form factor to provide monitoring functions. The monitoring unit 100 comprises a lens (e.g., fish-eye lens, etc.) with a camera 102 that operates to view a wide target area from a single location. A motion sensor 104 is included to detect motion within the target area. The monitoring unit 100 of an embodiment includes one or more environmental sensors for monitoring parameters of the local environment. For example, the monitoring unit 100 includes an ambient light sensor 106 and/or a temperature and humidity sensor 114. The monitoring unit 100 also includes an indicator 108 (e.g., LED indicator, etc.) to provide visual status on the operation of the monitoring unit 100. A microphone 110, a speaker 112, and a siren 116 are also included to detect noises in the environment, provide feedback, allow two way communications and alert noises. A stand 118 is coupled or connected to the monitoring unit 100 but may be removed for wall mounting applications.

FIG. 1B is a perspective view of the monitoring unit 100, under an embodiment. FIG. 1C is a rear view of the monitoring unit 100, under an embodiment. FIG. 1D is a side view of the monitoring unit 100, under an embodiment. FIG. 1E is a top view of the monitoring unit 100, under an embodiment. FIG. 1F is a bottom view of the monitoring unit 100, under an embodiment.

Figure 2A:
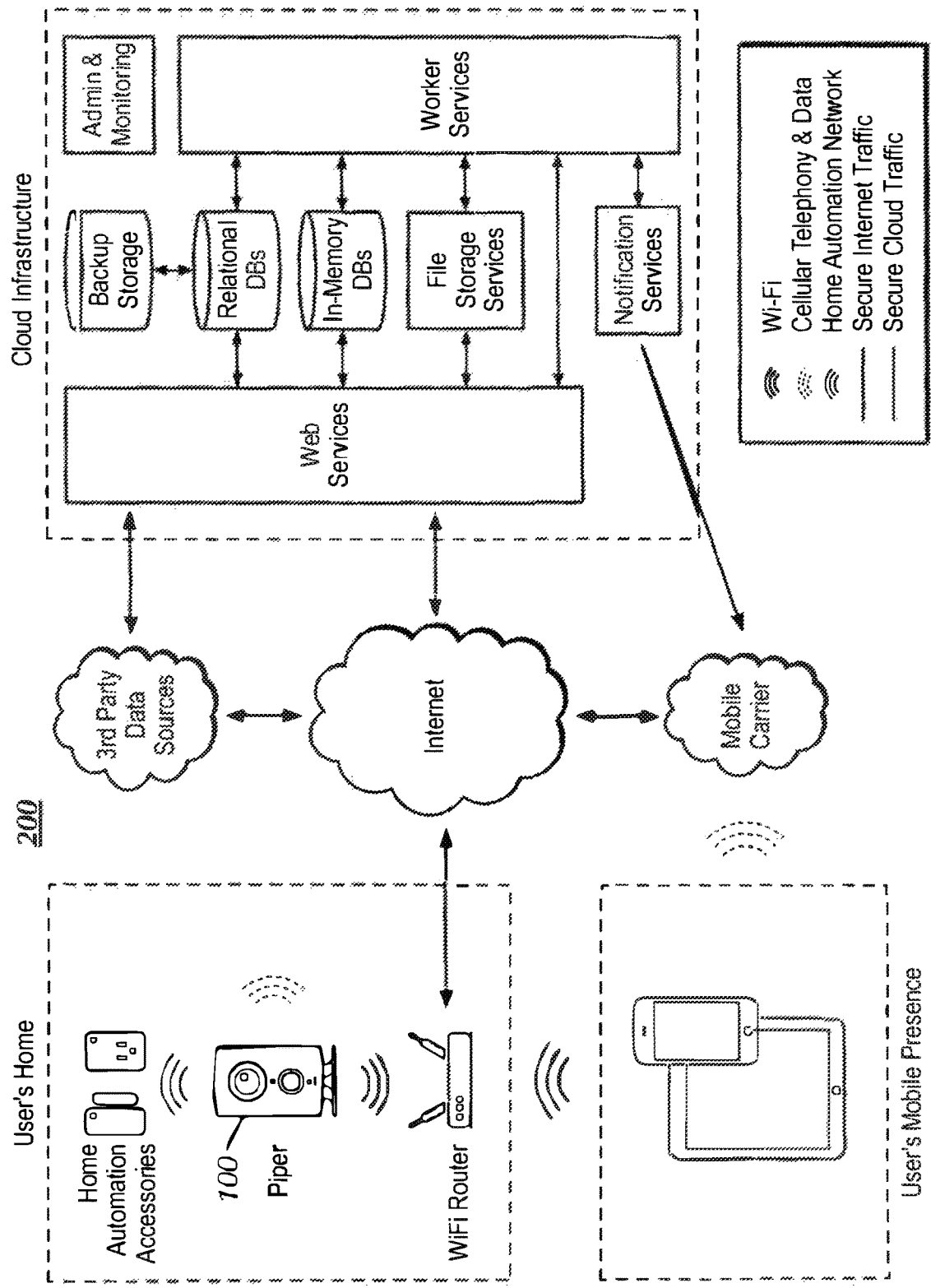
FIG. 2A is a system overview of the monitoring system, under an embodiment.

FIG. 2A is a system overview of the monitoring system 200, under an embodiment. The monitoring system 200 includes the monitoring unit 100 along with one or more additional components as appropriate to an installation of the monitoring unit 100. For example, the monitoring unit 100 of an embodiment is coupled to a wide area network (e.g., the Internet) via a Wi-Fi router and/or cellular data coupling or connection. The system also includes an application for installation on a user's smartphone or tablet, and a web application accessible from any computer. Additionally, the system 200 includes a cloud-based back-end supporting the mobile application, web application, and device firmware.

Figure 2B:
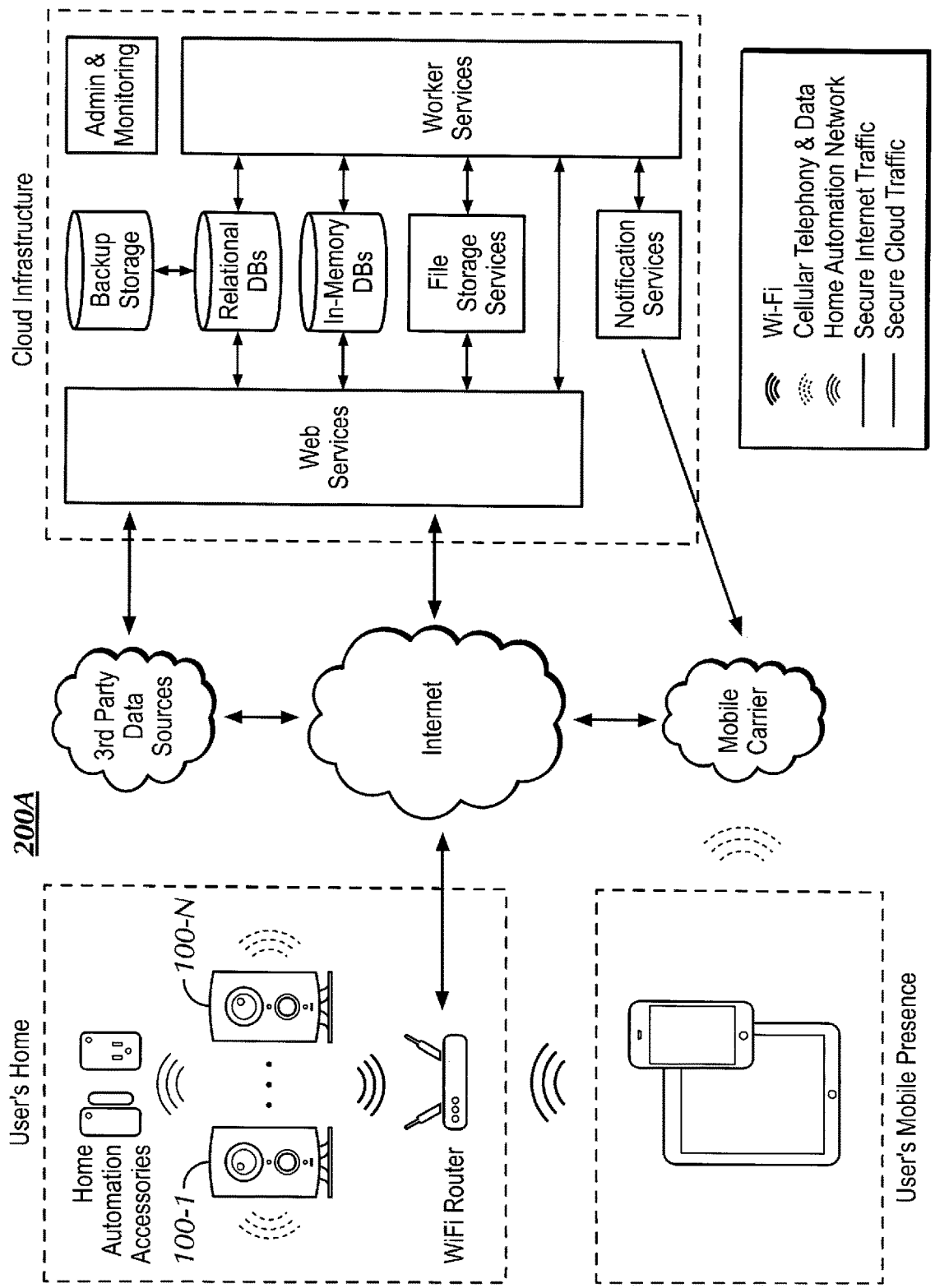
FIG. 2B is a system overview of the monitoring system 200A, under an alternative embodiment.

FIG. 2B is a system overview of the monitoring system 200A, under an alternative embodiment. The monitoring system 200A includes a plurality of monitoring units 100-1/100-N (collectively referred to as 100) along with one or more additional components as appropriate to an installation of the monitoring units 100. For example, the monitoring units 100 of an embodiment are coupled to a wide area network (e.g., the Internet) via a Wi-Fi router and/or cellular data coupling or connection. The system also includes an application for installation on a user's smartphone or tablet, and a web application accessible from any computer. Additionally, the system 200A includes a cloud-based back-end supporting the mobile application, web application, and device firmware of the monitoring units 100. The monitoring system 200A comprising a plurality of monitoring units is described in detail herein.

The monitoring unit is installed in a user's home (e.g., on the wall, using the provided wall-mount, on a flat surface, etc.) and is powered by a power source. The power source of an embodiment includes a Direct Current (DC) wall adapter, for example, but is not so limited. Battery-backup is available to ensure the security aspects of the system remain functional if there is a loss of power. The monitoring unit of an embodiment uses encryption for all outgoing and incoming data. A user can set up multiple monitoring units to monitor and secure several areas.

Users interact with the environment in which a monitoring unit is installed in a number of ways. The monitoring unit's mobile and web applications show current and historical environmental readings of its surroundings by reporting on temperature, humidity, ambient light and sound. This information is periodically uploaded by monitoring unit and stored in the cloud infrastructure using a time-series database. It is presented using current values and graphs in the Vitals section of the mobile and web application.

The monitoring unit's internal sensors provide a wealth of information or data about the device and its surroundings, for use in security and notification scenarios. The data provided includes but is not limited to information representing one or more of the following: unexpected motion within monitoring unit's field of view (FOV); temperature changes within the space; humidity changes within the space; physical movement of monitoring unit (due to vibrations or tampering); loud, unexpected sounds; and changes in ambient light.

The monitoring unit of an embodiment can be coupled or connected to various remote or peripheral devices or sensors. The monitoring unit includes a home area network (HAN) radio, or personal area network (PAN), to control and receive information from paired accessories such as sensors, switches, and dimmers. HAN-connected accessories can be controlled by way of security rules, a programmable schedule and internal sensor triggers such as ambient light and temperature. The HAN devices include but are not limited to IEEE 802.11 Wireless Local Area Network devices, and IEEE 802.15 Wireless Personal Area Network devices, for example Wi-Fi, Zigbee and/or Z-wave based devices, but are not so limited.

The monitoring unit includes couplings or connections among a variety of remote components like remote sensors and other devices at the premises, and supports discovery, installation and configuration of the remote devices coupled or connected to the system, as described in detail herein. The monitoring unit uses this self-generated sub-network to discover and manage the remote devices at the premises. The monitoring unit thus enables or forms a separate wireless and/or wired network, or sub-network, that includes some number of devices and is coupled or connected to the LAN or WAN of the host premises. The monitoring unit sub-network can include, but is not limited to, any number of other devices like wired devices, wireless devices, sensors, cameras, actuators, interactive devices, WiFi devices, and security devices to name a few. The monitoring unit manages or controls the sub-network separately or privately from other communications and transfers data and information between components of the sub-network and the LAN and/or WAN, but is not so limited.

The monitoring unit also provides a coupling or connection to a central monitoring station (CMS) data for remote monitoring of the premises. The data of an embodiment is provided to the CMS and to the remote device, but in other embodiments is provided to one of the remote device and the CMS. Under this embodiment, one or more monitoring units are coupled to the CMS via a network (e.g., one or more of WiFi, LAN, WAN, cellular, etc.). Alternatively, the monitoring units are coupled to the CMS via the network (e.g., WAN, cellular, etc.) and an intermediate server or device (e.g., remote server, etc.). In operation, the monitoring unit transmits collected data and information to the CMS based upon a user-selected state of the monitoring unit. The data transmitted by the monitoring unit includes data of the monitoring unit as well as data of and data received from devices coupled to the monitoring unit via the local sub-network. The monitoring unit automatically delivers data of one or more onboard and/or coupled devices to the CMS. The interactions and notifications between the monitoring unit and the remote CMS of an embodiment are controlled or managed by the mobile application running on the mobile device. As such, the user interface presented by the mobile application provides controls for enabling or disabling remote monitoring by the CMS; for example, a user can activate monitoring at the CMS via the mobile application when leaving town on a trip, and can deactivate CMS monitoring upon his/her return. The monitoring unit and remote server therefore provide a mechanism to activate and deactivate monitoring by the remote CMS.

An embodiment of this mechanism is an Application Programming Interface (API) using an interface technology such as REST or SOAP, for example, to send monitoring activation and deactivation messages to the CMS and to receive acknowledgements from the CMS. Other embodiments such as the client application, monitoring device, or remote server utilize the user selection to enable/disable the delivery of activity messages to the CMS, where the CMS is always available and uses the presence of messages to trigger monitoring periods. The current invention also anticipates the integration of the CMS billing system into the service to enable on-demand billing of monitoring services, and/or to offer time-based monitoring of the system (e.g. the CMS monitoring is active for a specific period of time).

Users can place the monitoring unit into one of a plurality of security modes (e.g., Home, Away, Vacation, Off) using the mobile application, thereby activating and deactivating the various security preferences (defined as rules). Other security modes, such as 'CMS Monitoring mode' for example, can be utilized as well to effectuate different behaviors for the device and/or for its monitoring. Rules and other configurations may be stored on the monitoring unit's firmware and as such do not require a centralized server environment. In another embodiment these rules and configurations are stored on a remote server or backed up to a remote server to facilitate replacement of a defective unit.

The monitoring unit's mobile application allows users to set rules for each security mode pertaining to notifications, home-automation actions and alarms based on a set of scenarios. Under a scenario, the monitoring unit's various sensors (both internal and externally paired) can alert a user to activity within their environment, using data from sensors. The notification options of an embodiment include but are not limited to mobile push, SMS messages, telephone calls, and electronic mail to name but a few.

Under another scenario, sensors and their corresponding actions are configured by way of the mobile application. The monitoring unit can also leverage the use of externally paired HAN sensors to drive actions and notifications. The HAN sensors can include one or more of thermostats, door sensors, actuators, door locks, garage openers, window sensors, light dimmers or switches, to name a few.

The monitoring unit under yet another scenario allows rules associated with sensors (whether externally-paired or internal) to control connected appliances by way of paired HAN dimmers and switches. Furthermore, the monitoring unit can control the state of IAN-connected appliances by way of a configurable schedule, based on time and/or sunrise/sunset based on installed location.

The monitoring unit allows a user to set up notification-only rules that are outside the scope of any security modes. These rules can result in mobile push notifications derived from the same sensors that trigger security mode rules.

The monitoring unit can alert the surrounding environment to a potential breach of security by way of a very loud siren, driven by rules associated with sensors, both internal and externally paired. The siren can also be triggered by external parties such as the CMS and/or the user from a remote device. This capability allows a remote entity to interact with the device to warn occupants or deter an intruder. Moreover, the monitoring unit's system receives weather and other environmental information. This can influence rules and also provide additional environmental status to the mobile and web applications.

The monitoring unit allows users to connect to a live stream of video and audio via their mobile application or any remote device. This video is captured and streamed using a very wide field-of-view (FOV) lens, allowing the user to electronically pan, tilt, and zoom within their space. Additionally, multiple angles of the captured live stream can be viewed at once, in a segmented fashion. Each segment represents a distinct view of the monitoring unit's surroundings and the direction and zoom level chosen by the user are retained when a user returns to the live stream.

Conventional video cameras using a wide angle lens and local on-camera 'de-warping' removed the distortion imparted by the wide angle lens locally on the camera processor to produce a flattened image, and then streamed portions or all of the flattened image to a remote device. In these systems the remote device displayed the de-warped video, but had no ability to simulate the raw video data being presented by the lens. These conventional systems therefore were optimized for lower-end remote devices that were not capable of advanced video processing.

In contrast to these conventional camera technologies, the monitoring unit described herein comprises 'Immersive 3D video streaming', which transmits lens-warped video data collected at the camera to the remote device where it is de-warped. In an embodiment, the raw lens-warped video data collected at the camera is transmitted or streamed to the remote device in a highly compressed format; in various alternative embodiments the warped video data collected at the camera can be clipped or processed in some manner before being compressed and transmitted or streamed. Regardless of any pre-processing technique applied to the video data collected at the camera, the embodiments described herein transmit or stream warped video data from the monitoring unit to the remote device, and the remote device performs de-warping of the video data. However, other alternative embodiments can de-warp the video data at the monitoring unit prior to transmitting the data stream to a remote device.

The local processor of the remote device manipulates the received video data to provide an optimal user experience. A key distinction in this approach is the ability to rely upon the high performance video decoding and three-dimensional (3D) manipulation capabilities present in state of the art remote devices, which include but are not limited to smart phones, tablet computers, personal computers, and other mobile and/or portable processor-based devices. Generally, the Immersive 3D video streaming process executing on the remote device decodes and decrypts the video stream to a raw video frame buffer, creates a 3D space that emulates the specific lens geometry of the camera, and maps the video frame buffer to the 3D space providing an 'immersive 3D video view' that allows the remote device to zoom, pan, and move around in the 3D space giving the perception of being 'inside the lens looking around'.

The monitoring unit of an embodiment generates a Immersive 3D video stream using components comprising a lens with a wide-angle geometry, as described in detail herein, that 'warps' or distorts the video to obtain the wide-angle view. The monitoring unit includes an image encoder that encodes the video image into a compressed streaming format. The monitoring unit of an embodiment stores the compressed streaming format with warped video to a local storage device coupled to the monitoring unit. Alternatively, the monitoring unit stores the compressed streaming format with warped video at a remote server or other remote processing component or memory to which it is coupled via a network coupling (e.g., LAN, WAN, Internet, etc.). Alternative embodiments may use other devices (e.g., a local Digital Video Recorder-DVR, etc.) to accomplish the process of encoding, compression, and storage separately from the monitoring device itself.

The monitoring unit streams the compressed video to a remote device (e.g., smart phones, tablet computers, personal computers, other mobile and/or portable processor-based devices, etc.). The monitoring unit of an embodiment streams the compressed video directly to the remote device. Alternatively, however, the monitoring unit streams the compressed video to the remote device via an intermediate server (e.g., relay server, intermediate DVR, etc.).

The remote device decompresses the received compressed video stream. The remote device decompresses the video stream and then further processes the resulting decompressed video images using data of the camera lens geometry, more specifically the wide-angle geometry (de-warping) of the camera lens. For example, the remote device of an embodiment decompresses the video stream using a software codec (e.g. FFMPEG) executing on a processor. The remote device of an alternative embodiment decompresses the video stream using a hardware codec. The remote device uses 3D rendering technology to map the warped video to a 3D space replicating the lens geometry. The data of the lens geometry used by the remote device to process the received video stream is used by the mobile application, under an embodiment, and is one or more of received dynamically from a remote server or monitoring unit, included in a mapping table at the mobile device, and known a priori, but is not so limited. In an alternative embodiment the lens geometry is specified as part of the data interchange associated with the video feed setup. In yet another alternative embodiment the mobile application stores data of a plurality of known lens geometries associated with the camera types supported by the application.

The remote device 'maps' the decompressed warped image to the 3D space representing the lens geometry and displays this 3D view using a display that is a component of or coupled to the remote device. The remote device includes a user interface that enables a user to 'move' around the environment of the monitoring unit by panning and zooming around the 3D space and the mapped video image. The user interface of an embodiment is generated by the mobile application, but is not so limited. The user interface of an embodiment enables a user to navigate the 3D space using pinching gestures and swiping gestures when the remote device includes a touchscreen display. Additionally, the remote device enables playing of and interacting with stored video clips generated by the monitoring unit, where the stored video clips are stored at local storage or remote server in the same way.

By way of example in an embodiment, the process for a remote device to receive the Immersive 3D video stream from the monitoring unit comprises the remote device creating a tunnel (e.g., Secure Sockets Layer (SSL), etc.) to the monitoring unit by coupling or connecting to an external port that was configured by the monitoring unit (e.g., using Universal Plug and Play (UPnP), etc.). The monitoring unit encodes the raw video image (e.g., 1280×1070) using an encoder application (e.g., H.264 with High Profile, etc.). The monitoring unit sends the encoded video stream to the mobile device using the tunnel (e.g., sends video stream using RTP tunneled in RTSP).

The mobile device of this example embodiment includes a multimedia data library (e.g., FFmpeg library, etc.) that decodes packets of the video stream (e.g., Real-time Transport Protocol (RTP) packets of H.264 stream) to an image buffer (e.g., a YUV color space image) in memory. The size of the memory buffer of an example is 1280×1070, but is not so limited. The mobile device creates an a virtual surface (e.g., Open Graphics Library (OpenGL)) through an API for rendering vector graphics. The virtual surface of this example embodiment is YUV for rendering the pan/zoomed image, where the image size is based on the mobile device, but the embodiment is not so limited. The mobile device user interface includes controls (e.g., pinch with fingers, zoom with fingers, etc.) for selecting a position of the rendered image on the display of the mobile device. Based on the selected position on the image, the mobile device takes a portion of the decoded image (e.g., YUV) and executes a de-warping and scaling algorithm (e.g., OpenGL) to produce a rendered subset image into the image surface.

Users interact with their premises during a live-streaming session by controlling appliances and speaking into their space through the monitoring unit's built-in two-way audio functionality, which streams live audio from the mobile application to the monitoring unit's speaker. The monitoring unit supports two-way voice sessions under numerous embodiments. For example, a remote device of an embodiment initiates a two-way voice session with one or more monitoring units at a premises. Similarly, a third-party monitoring station initiates a two-way voice session with one or more monitoring units at a premises. Additionally, the monitoring unit provides live video contemporaneously with or as a component of the two-way voice session with the remote device and/or third party monitoring station. The two-way voice sessions include sessions over a WAN (e.g., Internet Protocol (IP) via WiFi, etc.) and/or sessions over a cellular network (e.g., cellular voice, IP data, etc.), but are not so limited.

The monitoring unit can record video of events associated with rules triggered by internal and externally paired sensors. The monitoring unit of an embodiment continuously records video and audio in a loop, enabling it to report on an event by presenting footage before and after it occurs. Users can review these recorded events on the mobile and web applications and perform electronic pan, tilt, and zoom operations within the captured video, as though they were streaming it in real time.

The monitoring unit records a longer video if subsequent events happen in rapid succession. A single video is created which encapsulates the several events in question. The system understands that this particular video maps to several events, and vice-versa.

The monitoring unit allows users to record video in an on-demand fashion, triggered from the mobile and web applications. As with event-driven footage, users can perform electronic pan, tilt, and zoom operations within the captured on-demand video recordings via the mobile and web applications. The monitoring unit also includes smart sound detection, allowing captured loud sounds to be fed to characterization software which helps identify it, (e.g. a smoke alarm, barking dog, etc.).

The monitoring unit periodically transmits a heartbeat signal or message to the cloud or other network infrastructure, allowing the user to be notified when the monitoring unit disconnects from the Internet. The user is also notified when the monitoring unit reconnects and continues to post heartbeat information. If connectivity issues arise and events trigger video recording, the monitoring unit saves videos locally and queues them for later upload, when connectivity resumes.

The cloud infrastructure of an embodiment comprises one or more of a number of components. The components include for example, front-end web services the expose or include an Application Programming Interface (API) for both the mobile application and the monitoring unit firmware. This public traffic is encrypted and authentication is performed against strong firmware and user credentials. Additionally, back-end databases include user account information and settings, and monitoring unit configuration and time-series sensor and event data. Back-end in-memory databases house real-time sensor history, cached data and heartbeat information.

The cloud infrastructure components also include notification services and worker services. The notification services send information to users by way of direct and third-party assisted methods. These include email, mobile push notifications, SMS and voice calls. The worker services process uploaded content, check in-memory real-time data for connected devices' heartbeats, trigger notifications, start on-demand recordings for users and perform additional infrastructure and product-related functions. File storage services providing fast and reliable disk space for the entire infrastructure.

Additionally, the cloud infrastructure components include infrastructure backup services, multi-site disaster recovery for database, worker and web services, and redundancy for each component. High availability for all worker and web services is provided by way of application-level clustering and load balancing for incoming web service requests from mobile apps and firmware.

Multiple monitoring units are installed at various independent locations at a premises, and when so installed function as a distributed premises security system, under an embodiment and as described herein. The monitoring units of this collective installation automatically discover and couple to each other and share data over a device network (e.g., IP, WiFi, wired connection, Z-Wave, etc.) that is separate and independent from a LAN and/or WAN to which the monitoring units are coupled at the premises. In an embodiment the monitoring units utilize the LAN (Wifi, Ethernet, etc.) to couple to each other and share data. In another embodiment the monitoring units utilize a WAN (such as a cellular or broadband network) to couple to each other and share data. In yet another embodiment the monitoring devices are installed in physically remote locations (such as a home and an office) and are coupled via a WAN, but can still share data and form a distributed security network. The monitoring units thereby combine logically to form an integrated monitoring or security network at the premises or between premises. Each monitoring unit includes an automatic installation process for adding and removing itself from this integrated network. The monitoring units are configured to repeat at least one message between devices in the integrated security network formed by the coupling of the devices. When the installation includes multiple monitoring units, the collection of monitoring units are controlled or monitored from a single mobile application and are associated and managed with a single user account. Similarly, the collection of monitoring units is coupled to a remote service and monitored at the CMS.

Figure 3:
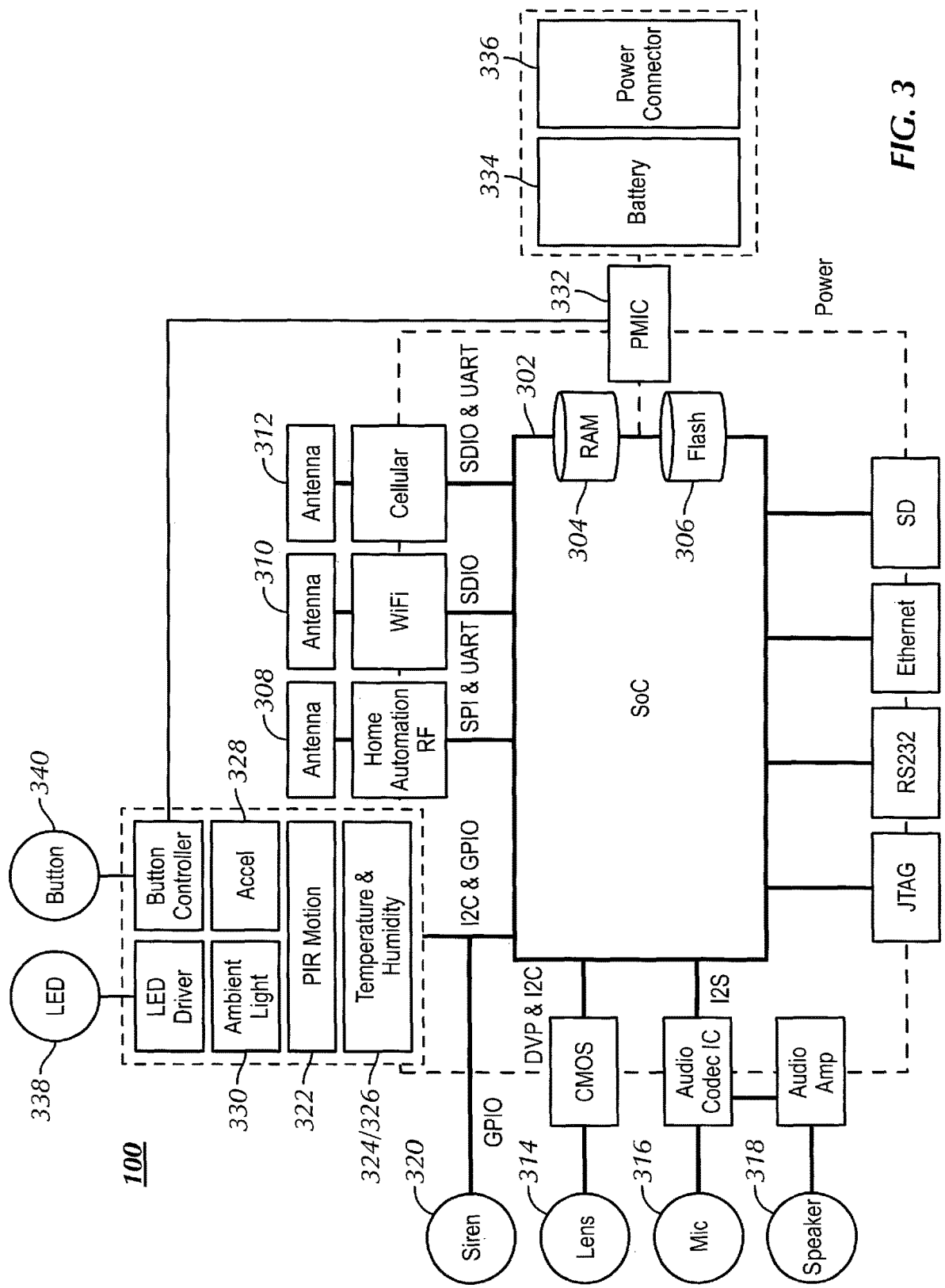
FIG. 3 is a hardware block diagram of the monitoring system, under an embodiment.

FIG. 3 is a hardware block diagram of the monitoring system, under an embodiment. The monitoring unit's hardware architecture comprises but is not limited to one or more of the following components: ARM System-on-chip 302; DDR Memory 304; Flash storage 306; Home area network RF module with antenna 308; Wi-Fi (or local area network technology) module with antenna 310; Cellular data module with antenna 312 if provisioned; Camera system comprising a multi-megapixel CMOS sensor and very wide FOV lens 314; Audio system comprising a microphone 316 and speaker 318; Alarm siren 320; Passive infrared (PIR) motion sensor with a very wide FOV Fresnel lens 322; Temperature sensor 324; Relative humidity sensor 326; Accelerometer 328; Ambient light sensor 330; Power system 332 comprising a DC jack 334 and battery compartment 336; RGB LED indicator 338; Push-button 340.

Figure 4:
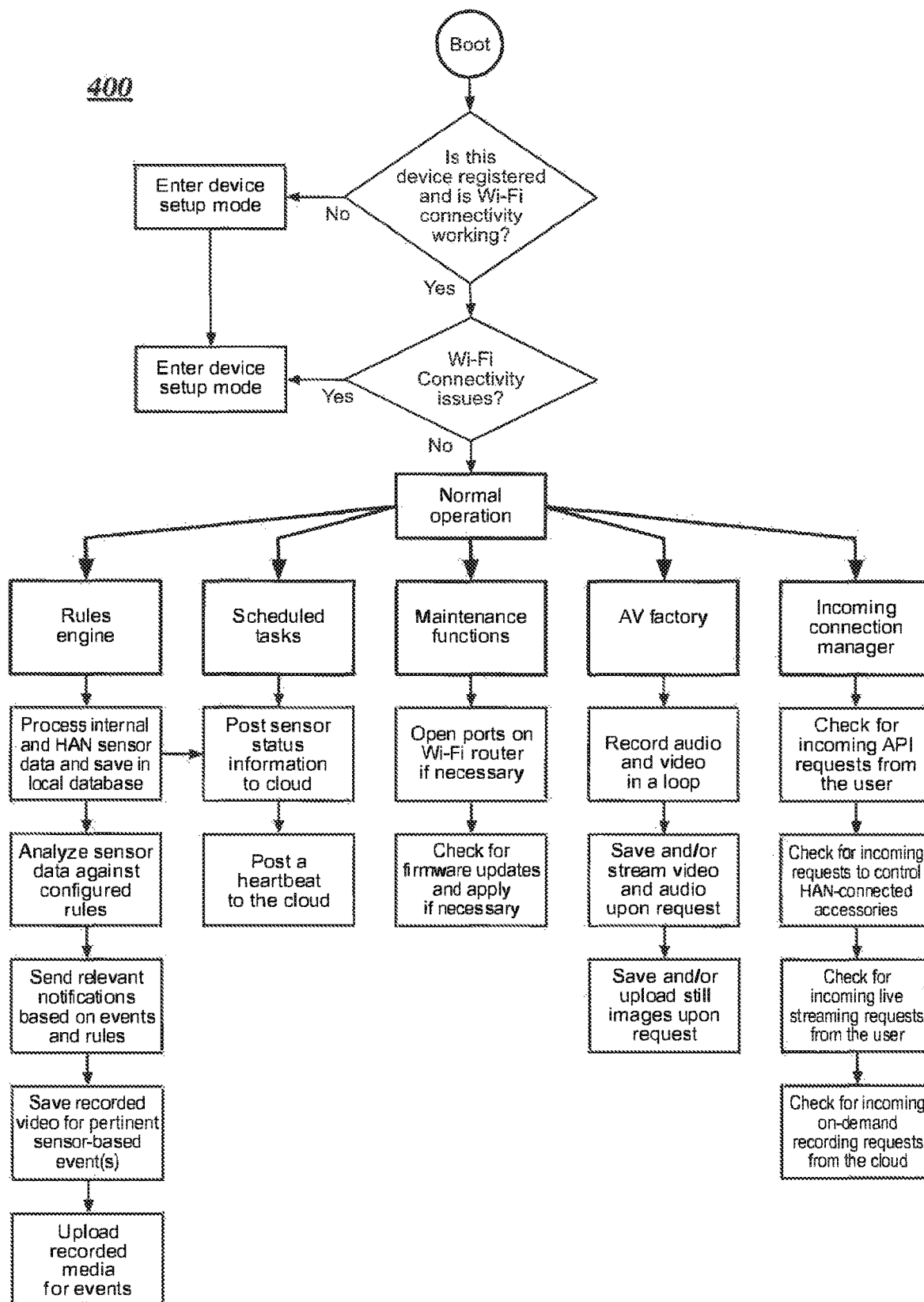
FIG. 4 is a method of operation of the monitoring unit, under an embodiment.

FIG. 4 is a method of operation of the monitoring unit, under an embodiment. The monitoring unit's firmware is based upon an operating system such as Linux, for example, but is not so limited. Specialized software or applications along with this operating system provides the services, API and functionality for set up and use of the monitoring unit's features in concert with the cloud infrastructure and mobile and web applications.

During the user's initial setup of monitoring unit, the following tasks are performed by the firmware:

a. The monitoring unit's firmware boots.

b. Since no existing device information is present, the monitoring unit creates a Wi-Fi access point for setup functions.

c. User launches the mobile application and after creating an account using their information begins the setup process.

d. User connects to monitoring unit's Wi-Fi access point and submits Wi-Fi credentials for their home network.

e. The monitoring unit attempts to connect with the home network using the provided Wi-Fi credentials.

f. The monitoring unit registers itself to the cloud backend, associates with the current user and attempts to open ports on the user's Internet router (for incoming connections) using Universal Plug and Play (UPNP) or Network Address Translation (NAP) Port Mapping Protocol (PMP), depending on the type of router present.

g. Once fully connected, the monitoring unit turns off its Wi-Fi access point and begins normal operation.

h. In the cases where a new Wi-Fi router is present, the monitoring unit has moved to a new environment, or connectivity to the existing router fails, the monitoring unit can accept new Wi-Fi credentials in a similar fashion to the initial setup process.

Embodiments described herein include a setup or enrollment process that comprises determining geolocation of the monitoring unit during installation at the premises. The monitoring unit of an embodiment incorporates a WiFi module (processor and radio (802.11)), and during enrollment the monitoring unit puts the WiFi module into 'Access Point mode'. The mobile device running the mobile application described in detail herein enrolls as a WiFi client to the monitoring unit access point. The mobile application then provides new WiFi credentials (e.g., service set identification (SSID), password (optional), etc.) to the monitoring unit via the WiFi access point; subsequently, the mobile application automatically switches the mobile device over to the same WiFi SSID, or the user manually switches the mobile device to that SSID using a network configuration utility. Upon receipt of the new WiFi credentials, the monitoring unit automatically switches its WiFi processor to enroll as a client at the new WiFi SSID (using the optional password). Either the monitoring unit or the mobile application initiates a process to store the WiFi credentials on a remote server or other remote device. The monitoring unit of an embodiment restores the WiFi credentials from a remote server, but the remote server of an alternative embodiment initiates restoration of the WiFi credentials of the monitoring unit.

The mobile application of an embodiment provides numerous operations, but is not so limited. For example, the mobile application provides a user interface that enables a user to switch the monitoring unit to the access point mode in order to change the SSID. The mobile application provides authentication directly to the camera (e.g. username, password, etc.). Alternatively, the mobile application provides authentication against a remote server.

The mobile application provides to one or more monitoring units location information corresponding to the monitoring unit installation, where the location information corresponding to the monitoring unit is location data determined at the mobile device. The monitoring unit then provides its location data to the remote server. Alternatively, the mobile application provides the location data of the monitoring unit installation directly to a remote server or other remote device. The monitoring unit of an embodiment includes an administrative tool that provides information about numerous monitoring units and their respective physical locations.

In an alternative embodiment the monitoring unit is temporarily coupled or connected via a physical connector (e.g. a USB cable) to a mobile device running the mobile application. In this embodiment the mobile application delivers the Wifi SSID and password over the wired connection, and the monitoring device then switches to the Wifi access point as described above.

Generally, the monitoring unit's operating state comprises but is not limited to the following:

a. Sensor polling is running and receiving raw data from sensors.

b. The rules engine is running and can interface with sensors.

c. The audio and video service and RTSP server are running and are ready to accept incoming connections, record footage in a loop and detect loud sounds.

d. The PIR motion sensor service is running and able to detect movement within the monitoring unit's FOV.

e. Automated tasks run at their pre-defined intervals and perform, but are not limited to, one or more of the following: maintain contact or communication between the monitoring unit and the cloud back-end and ensure incoming ports remain open on the user's Internet router; check for updates to the monitoring unit's firmware; post status updates about the current environment around the monitoring unit; post heartbeats periodically to inform the cloud backend of the monitoring unit's state.

Sensors and Rules

The sensor polling service reads from internal sensors (e.g., temperature, humidity, ambient light, acceleration/motion, etc.) and sends the data to the rules engine. It can also receive a signal from any other part of the firmware to force an immediate read of the sensors. All sensor data is sent to the rules engine.

The PIR motion sensor service reads from the PIR software driver directly, but is not so limited. The motion sensor, which implements a Bessel filter in order to eliminate false positives, issues a message to the Rules engine if a threshold for motion is exceeded.

When loud sound above a predefined threshold is detected, a signal is passed to the rules engine. When appropriate, the loud sound in question is passed through characterization software to help identify it, (e.g. a smoke alarm, barking dog, etc.).

The rules engine loads a list of rules for notifications for the current security mode (home, away, or vacation) from a database into memory. The rules engine also loads any HAN control rules that can be controlled via schedule, ambient light, temperature or any other sensors, be they internal or external. Notification-only rules are processed in parallel to mode-based security rules.

The rules engine saves the data with a timestamp in the monitoring unit's firmware database. The data is also sent to each active rule/control in order to determine what action, if any, should be taken (e.g. turn on an appliance, sound the siren, notify the user etc.).

Audio and Video

The audio and video service is responsible for streaming media, saving to a file and detecting loud sounds.

For saving footage to a file, audio and video are encoded and placed into a circular buffer of a certain time. This enables the monitoring unit to capture video and audio "before" an event has occurred. This queue is operating when the system is on but is not so limited.

For streaming, video and audio are encoded and served via RTP/RTSP to a user's mobile application. The streaming is encrypted and supports multiple clients at once.

Figure 5:
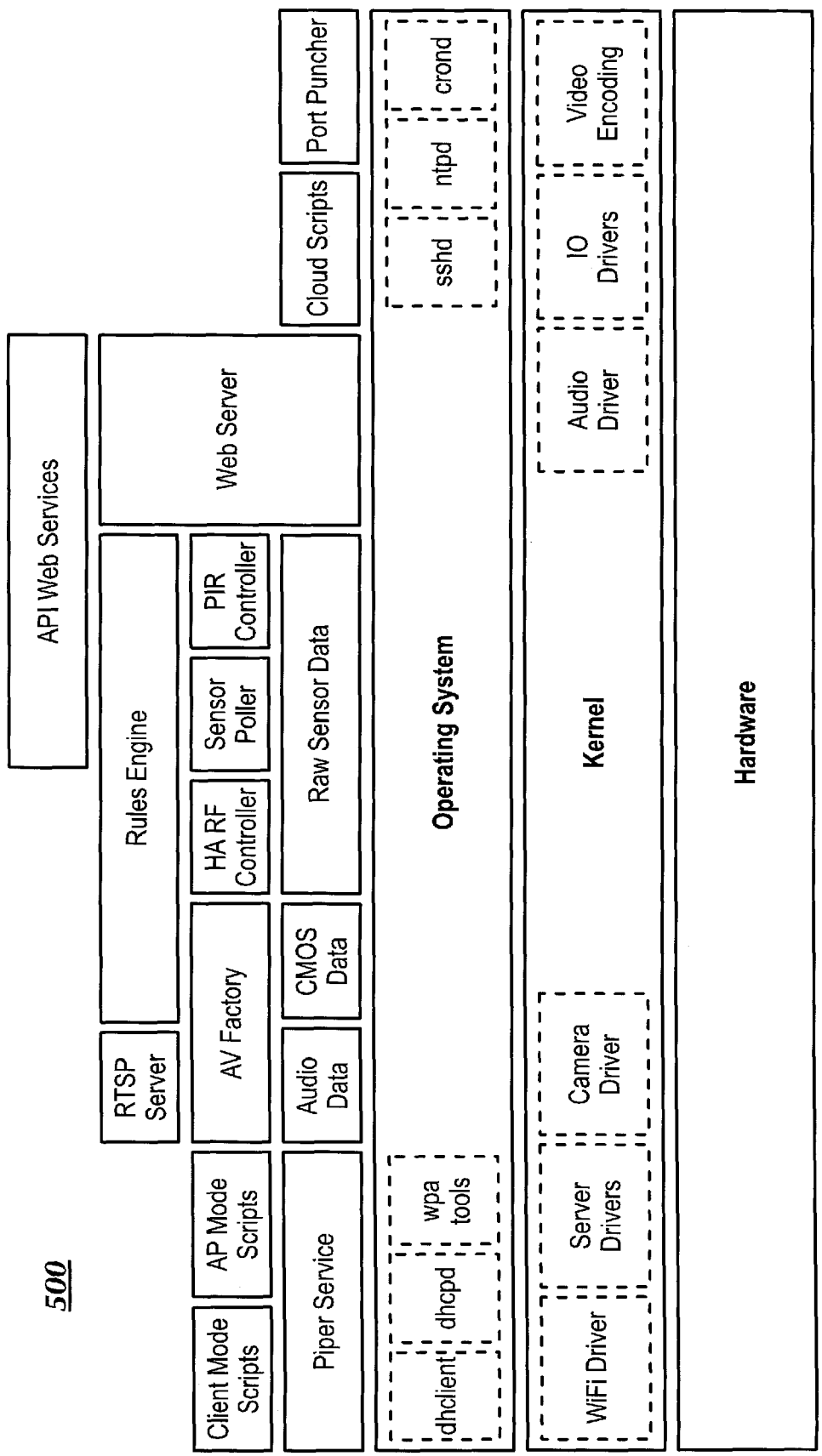
FIG. 5 shows a block diagram of the monitoring unit firmware, under an embodiment.

FIG. 5 shows a block diagram of the monitoring unit firmware, under an embodiment. The mobile application is the user's interface to the monitoring unit. The mobile application is executed on a smartphone or other personal or mobile electronic device. Within the application, the user's account is created, security and notification rules are defined, environmental readings are displayed, live streaming takes place and other settings are submitted to the cloud back-end and the monitoring unit's firmware. The application also serves as a tool to set up the monitoring unit's hardware, enabling the monitoring unit to pair with the user's home Wi-Fi network.

Key functions are accessed from the application's tab bar at the bottom of the screen, once the user has logged into their account.

Figure 6A:
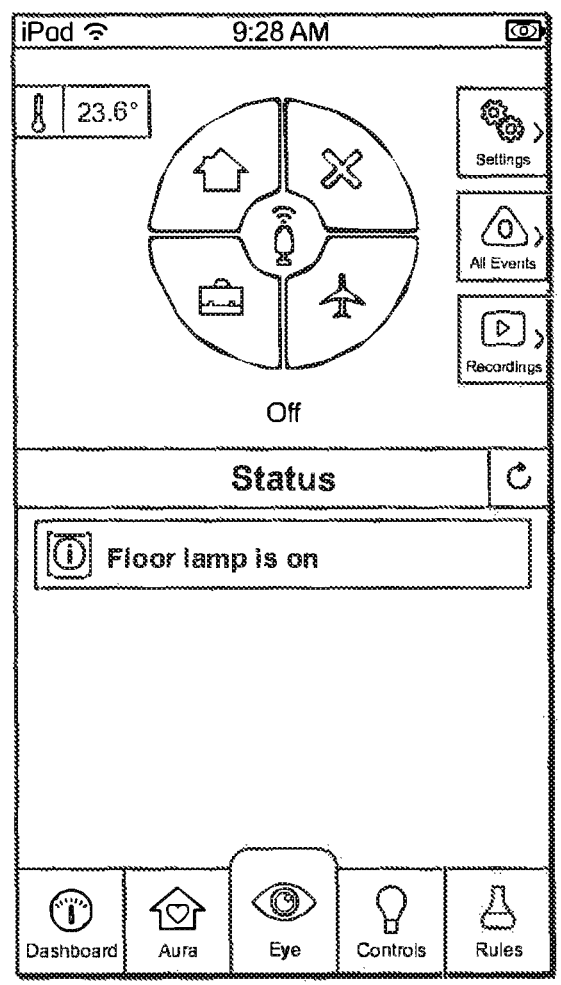
FIGS. 6A-6B is an example monitoring system dashboard user interface on a mobile device, under an embodiment.
Figure 6B:
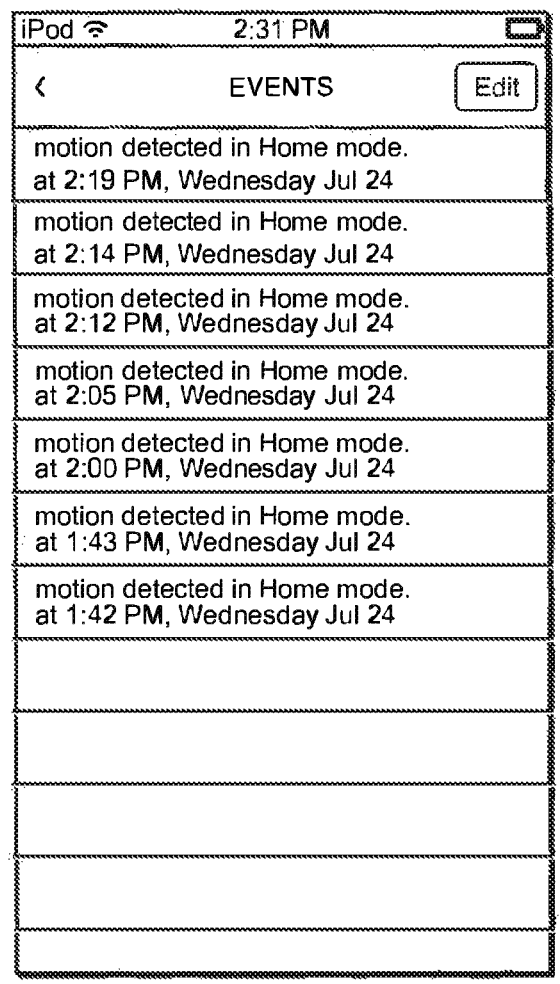

FIGS. 6A-6B show an example monitoring system dashboard user interface on a mobile device, under an embodiment. The Dashboard provides an at-a-glance view of the monitoring unit's system and provides access to one or more of the following functions: the monitoring unit's current security mode; the temperature near the monitoring unit; the monitoring unit's Wi-Fi signal strength; current status of HAN-connected accessories; weather alerts, if present; access to Events, Recordings, and Settings; access to the Night Stand.

Figure 7:
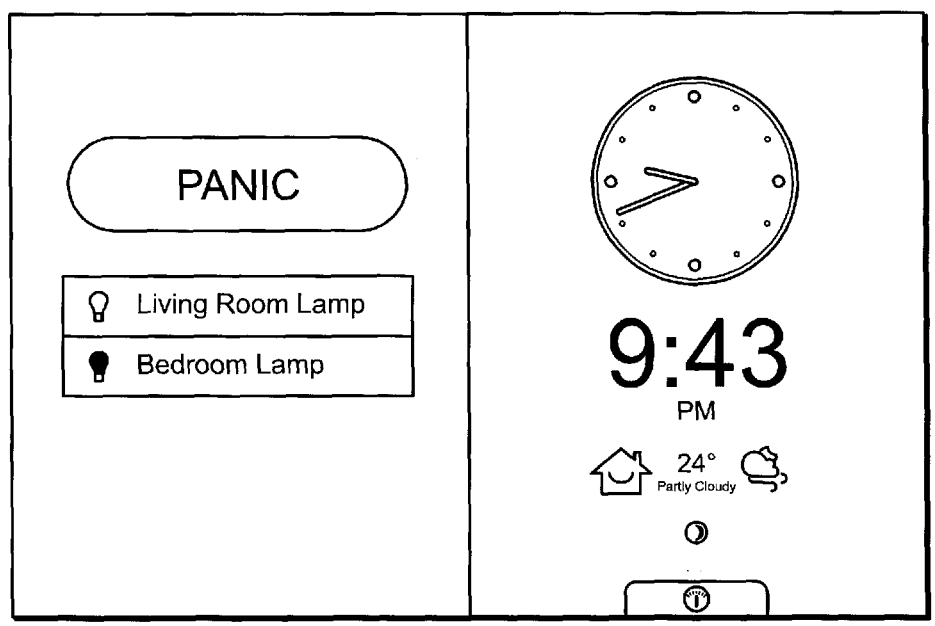
FIG. 7 is an example monitoring system night stand mode user interface on a mobile device, under an embodiment.

FIG. 7 is an example monitoring system Night Stand mode user interface on a mobile device, under an embodiment. The user can activate the Night Stand mode (available from the Dashboard), providing access to the various HAN-connected control accessories, a clock, weather information, and a panic button. Pressing the panic button activates the monitoring unit's siren.

Figure 8:
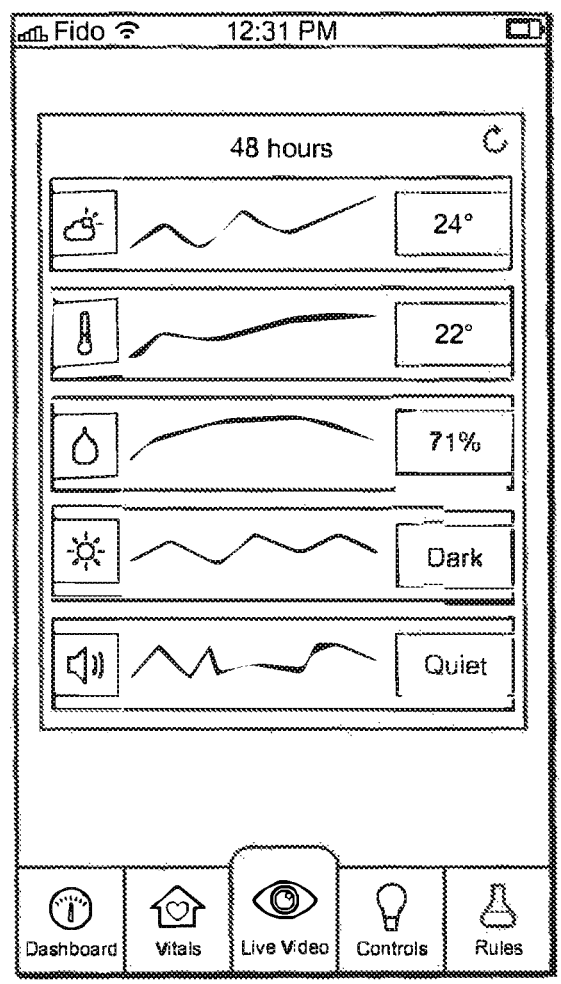
FIG. 8 is an example monitoring system status screen on a mobile device, under an embodiment.

FIG. 8 is an example monitoring system status screen on a mobile device, under an embodiment. The Vitals section displays monitoring unit's internal sensor readings and external weather information in an easy-to-understand format. Historical information is displayed using graphs allowing the user to see trends for each reading.

Figure 9:
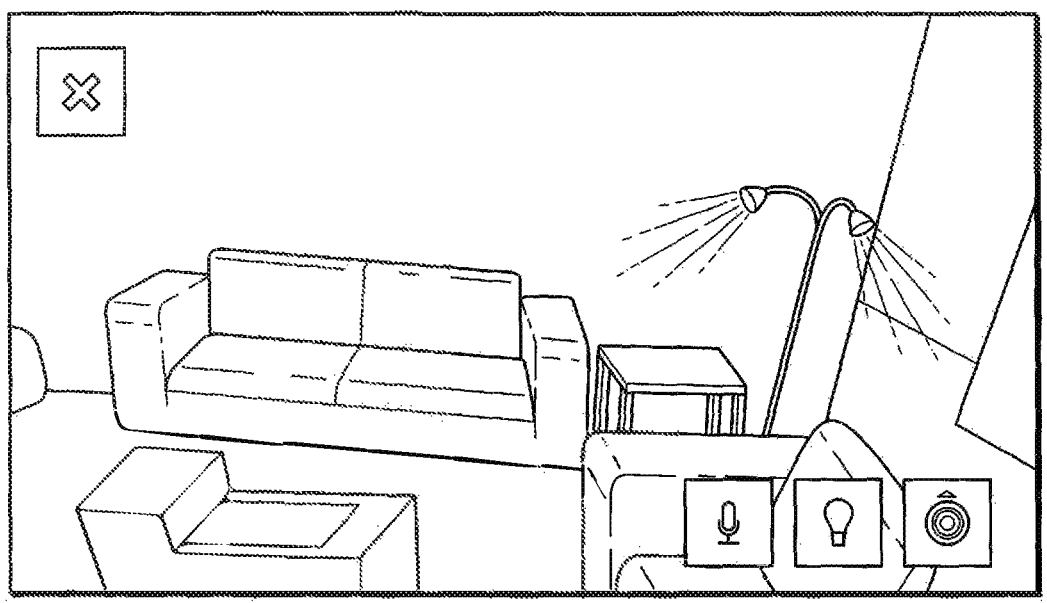
FIG. 9 is an example live streaming user interface display on a mobile device, under an embodiment.

FIG. 9 is an example live streaming user interface display on a mobile device, under an embodiment. Tapping or selecting the center icon of the mobile application's tab bar launches live streaming and couples or connects the user securely to the monitoring unit's built-in wide FOV camera. The user can then pan, tilt, and zoom the live stream of monitoring unit's surroundings, control connected HAN plug-in modules (e.g. turning on a light) and stream audio from the microphone of their mobile device to the user's space by way of monitoring unit's built-in two-way audio feature.

Figure 10:
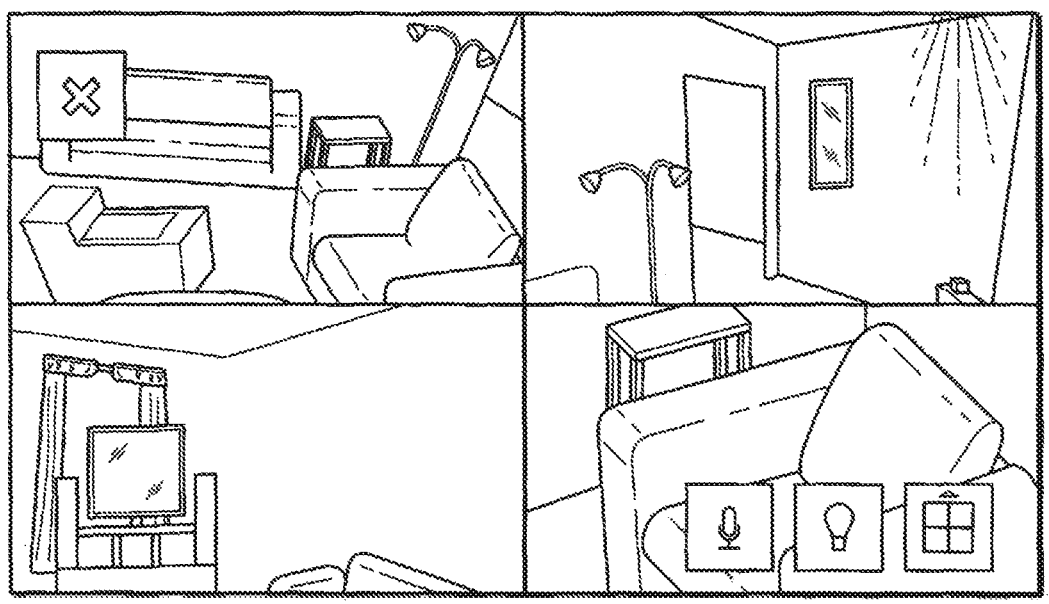
FIG. 10 is an example live streaming multi-view user interface display on a mobile device, under an embodiment.

FIG. 10 is an example live streaming multi-view user interface display on a mobile device, under an embodiment. Users can also choose to switch to a multi-view version of the live stream, which allows them to look at different areas of their space at the same time. This is achieved by presenting the user with several smaller views of the pan, tilt, and zoom video. The video image is segmented allowing multiple areas within the field of view of the camera to be isolated. The image captured by the camera has wide angle viewing area such as provided by a fish-eye lens. The image maybe de-warped and post-processed to provide a more viewable image. The monitoring unit remembers the last-used settings of the live stream, including the direction the user was looking and the zoom level of the video.

Figure 11:
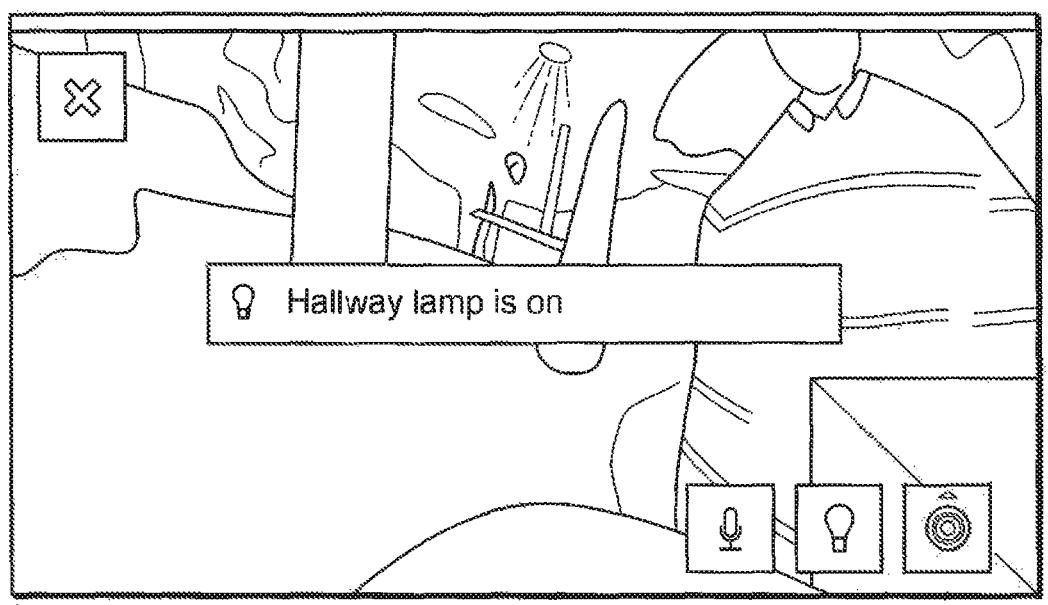
FIG. 11 shows monitoring system accessory control on a live streaming user interface on a mobile device, under an embodiment.

FIG. 11 shows monitoring system accessory control on a live streaming user interface on a mobile device, under an embodiment. If the user has paired HAN control accessories to monitoring unit, they can be accessed and controlled from within the live video screen. This allows a user to turn an appliance on or off and see the results in real time, if desired.

Figure 12A:
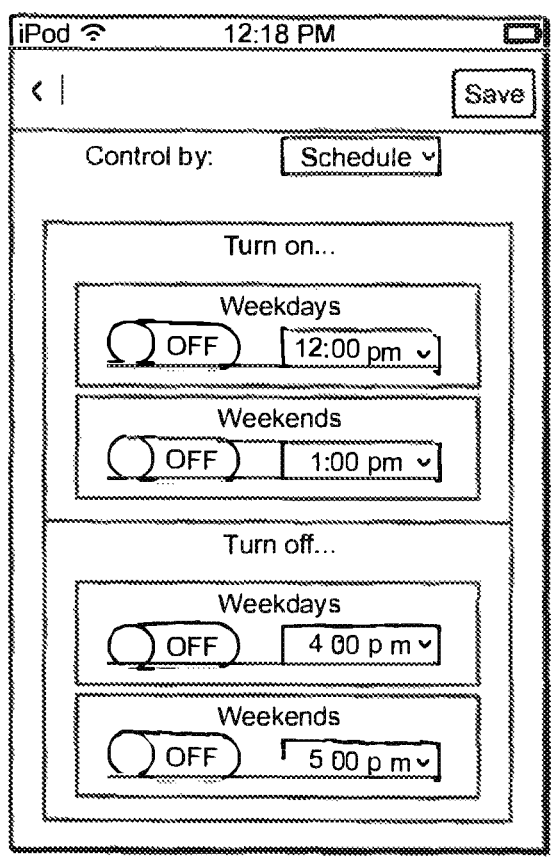
FIGS. 12A-12C show control and scheduling screens for the monitoring unit on a mobile device, under an embodiment.
Figure 12B:
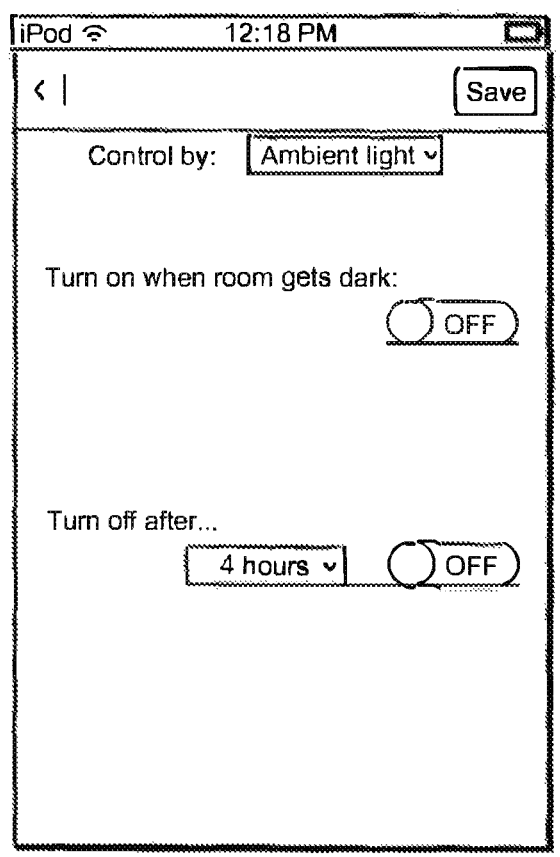
Figure 12C:
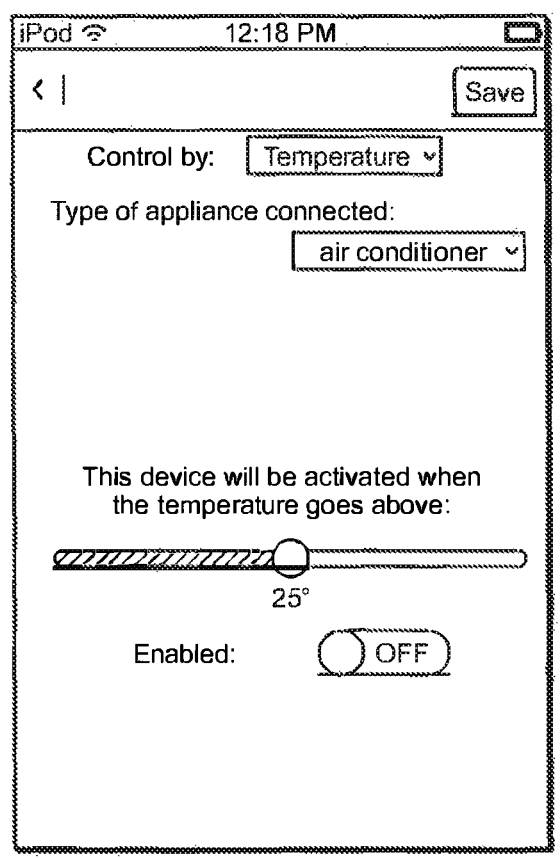

FIGS. 12A-12C show control and scheduling screens for the monitoring unit on a mobile device, under an embodiment. The Controls section allows configuration and control of HAN-connected accessories. These accessories can be configured via one or more of a timed schedule, sunrise/sunset, ambient light level, and temperature.

Figure 13A:
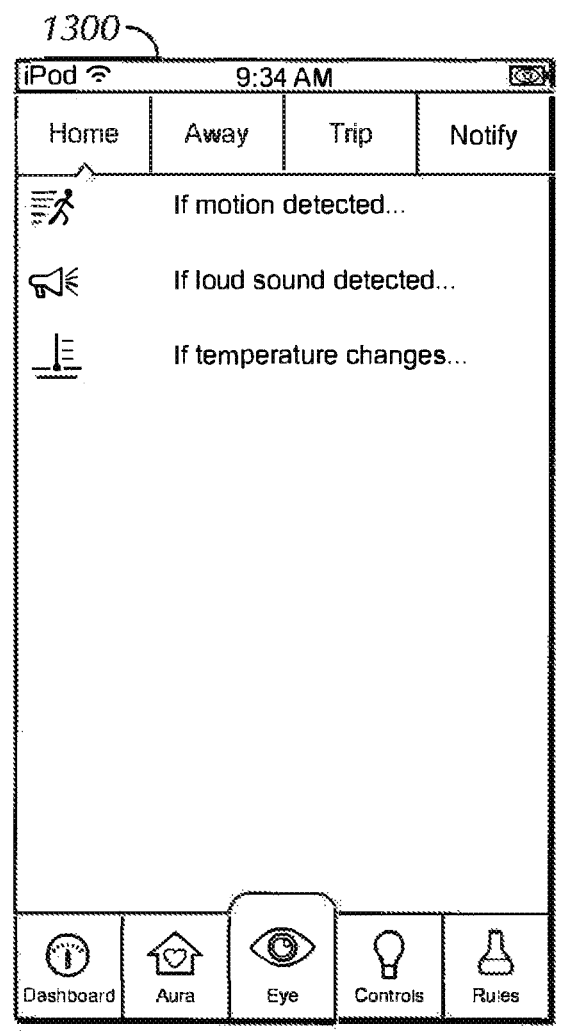
FIGS. 13A-13B show a user interface for configuring rules for the monitoring system unit on a mobile device, under an embodiment.
Figure 13B:
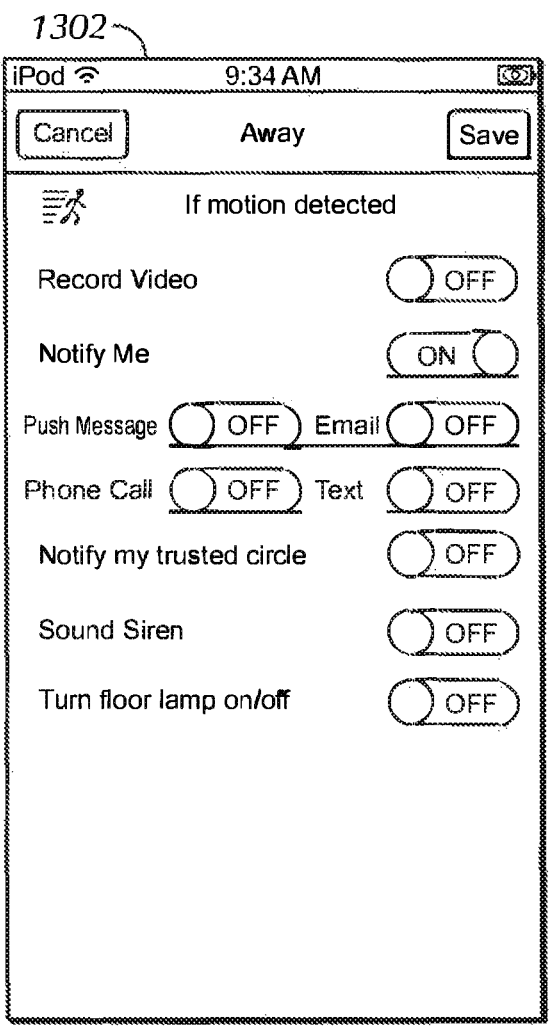

FIGS. 13A-13B show a user interface for configuring rules for the monitoring system unit on a mobile device, under an embodiment. The rules section allows the user to set security-related actions for motion, loud sound and temperature change triggers. Actions can be set for each security mode and include but are not limited to one or more of the following: record video and audio of the event; notifications; push message; electronic mail; phone call; SMS message; notification to a user's Trusted Circle members; the sounding of the monitoring unit's built-in siren; control of any connected HAN switches.

Additionally, notification-only options are present which allow the user to be informed of events outside the scope of the current security mode.

Additional functionality may be provided by the camera such as motion detection and ambient light detection. The processor may use image processing to determine characteristics of the image for use in motion detection, face recognition or light detection. In addition the microphone may be used for voice recognition function of the monitoring unit.

Figure 14B:
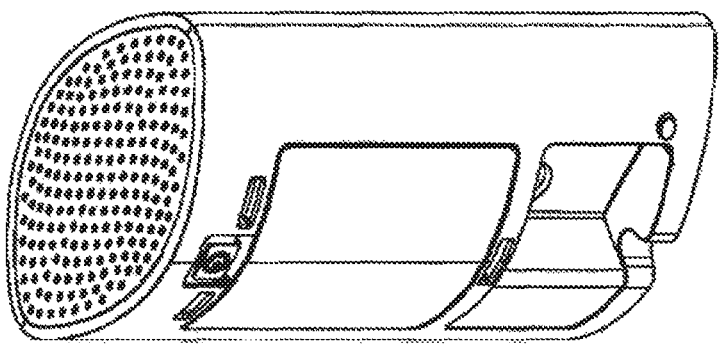
FIG. 14B is a rear perspective view of the monitoring unit with a detachable stand, under an embodiment.
Figure 14B:
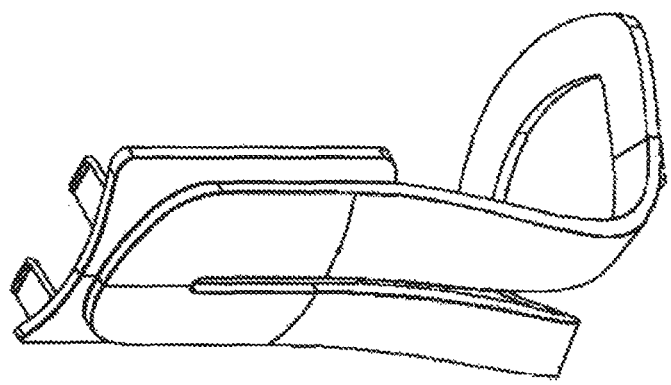
Figure 14A:
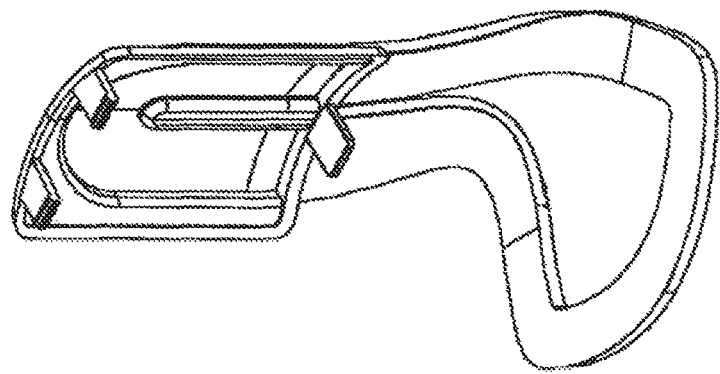
FIG. 14A is a front perspective view of the monitoring unit with a detachable stand, under an embodiment.
Figure 14A:
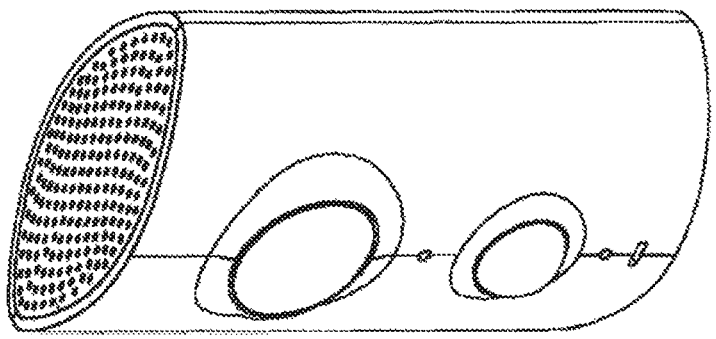

FIG. 14A is a front perspective view of the monitoring unit with a detachable stand, under an embodiment. FIG. 14B is a rear perspective view of the monitoring unit with a detachable stand, under an embodiment.

Figure 15B:
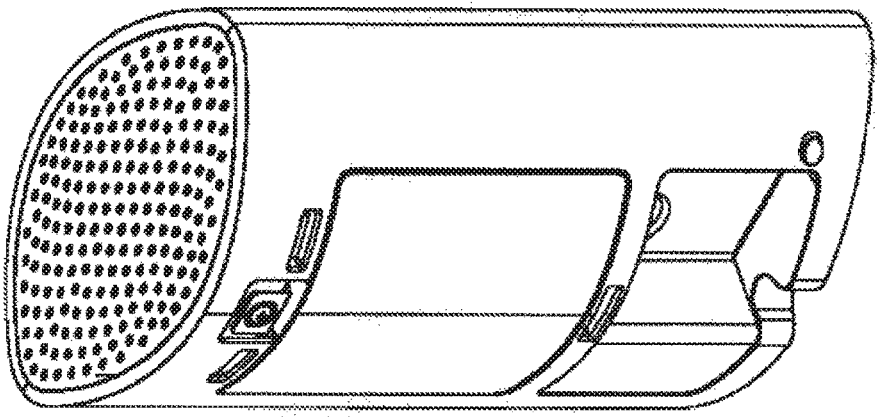
FIG. 15B is a rear perspective view of the monitoring unit with a detachable wall bracket, under an embodiment.
Figure 15A:
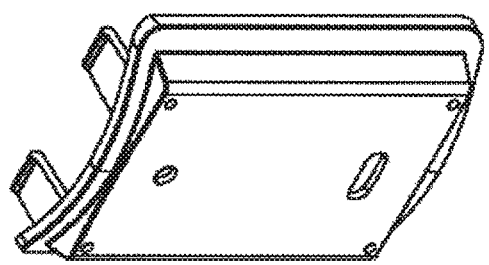
FIG. 15A is a front perspective view of the monitoring unit with a detachable wall bracket, under an embodiment.
Figure 15A:
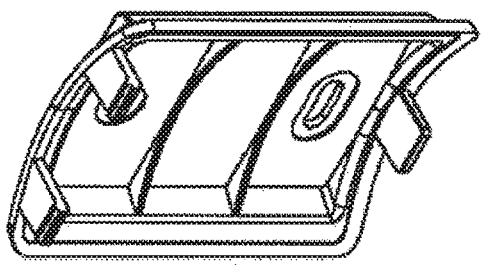
Figure 15A:
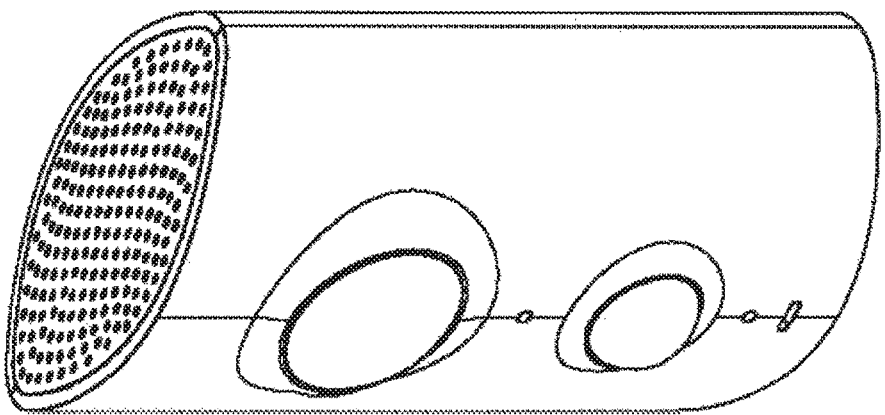

FIG. 15A is a front perspective view of the monitoring unit with a detachable wall bracket, under an embodiment. FIG. 15B is a rear perspective view of the monitoring unit with a detachable wall bracket, under an embodiment.

Embodiments described herein include a monitoring unit comprising a camera. The monitoring unit comprises a network interface. The monitoring unit comprises a processor coupled to the camera and the network interface. The monitoring unit comprises at least one application executing on the processor. The processor receives an image from the camera. The processor receives sensor data from at least one sensor coupled to the processor. The processor generates an alert based upon a change in at least one of the image and the sensor data. The alert is sent via the network interface to a mobile device.

Embodiments described herein include a monitoring unit comprising: a camera; a network interface; a processor coupled to the camera and the network interface; and at least one application executing on the processor, wherein the processor receives an image from the camera, wherein the processor receives sensor data from at least one sensor coupled to the processor, wherein the processor generates an alert based upon a change in at least one of the image and the sensor data, wherein the alert is sent via the network interface to a mobile device.

The monitoring unit of an embodiment comprises at least one a memory device coupled to the processor.

The monitoring unit of an embodiment comprises at least one communication module coupled to the processor.

The at least one communication module comprises a home area network (HAN) radio frequency (RF) module.

The at least one communication module comprises a Wi-Fi module.

The executing of the at least one application generates an enrollment process.

The enrollment process automatically places the WiFi module into an Access Point mode.

The mobile device comprises a mobile application, wherein the mobile application enrolls as a client to the Access Point.

The mobile application provides WiFi credentials to the processor via the Access Point.

At least one of the mobile application and the processor initiate storage of the WiFi credentials on a remote server.

At least one of the remote server and the processor restore the WiFi credentials from the remote storage device.

The mobile application provides authentication against at least one of the processor and a remote server.

The processor automatically switches the WiFi module to enroll as a client using the WiFi credentials.

The mobile application automatically switches the mobile device to enroll using the WiFi credentials.

The mobile application provides a user interface that includes at least one control for switching the processor to the Access Point mode to change the WiFi credentials.

The mobile application provides to a device location information corresponding to installation of the monitoring unit.

The device comprises a remote server.

The device comprises at least one of the monitoring unit and at least one additional monitoring unit.

The monitoring unit of an embodiment comprises an administrative application that provides information about at least one monitoring unit that includes the location information.

The at least one communication module comprises a local area network (LAN) module.

The at least one communication module comprises a cellular data module.

The at least one communication module is coupled to a remote device to communicate with the remote device.

The at least one communication module is coupled to a remote device to communicate over an Internet Protocol (IP) channel.

The at least one communication module is coupled to a remote device to communicate over a cellular channel.

The communication comprises a two-way voice session with the remote device.

The communication comprises a data session, wherein video images are transmitted during the data session.

The remote device comprises the mobile device.

The remote device comprises a central monitoring station.

The communication module automatically establishes a coupling with the at least one sensor.

The communication module automatically establishes a coupling with a local area network (LAN) at the premises.

The at least one application transfers data between at least one device on the LAN.

The communication module forms a sub-network at the premises.

The sub-network is a private network.

The at least one sensor is coupled to the sub-network.

Devices couple to the sub-network and communicate over the sub-network, wherein the devices include at least one of wireless devices, wired devices, and IP devices.

The monitoring unit of an embodiment comprises a remote server including a user account coupled to the processor.

The camera comprises an image sensor and a lens.

The camera comprises a lens including a wide-angle geometry, wherein the camera generates images including warped images, wherein the camera generates the images using a wide-angle view mapped to the geometry of the lens from collected images.

The camera comprises an encoder that encodes collected images to generate a processed data stream.

The processed data stream is a compressed video stream.

The monitoring unit of an embodiment comprises memory coupled to the camera, wherein the camera stores to the memory the processed data stream that includes warped video.

The memory is local to the camera.

The memory is remote to the camera.

The camera streams the processed data stream to a remote device, wherein the remote device comprises at least one of a mobile device and a server.

The camera streams the processed data stream directly to the remote device.

The camera streams the processed data stream to the remote device via at least one intermediary device.

Remote device processes the processed data stream using knowledge of a wide-angle geometry of the lens.

The processing comprises decompressing the processed data stream.

The remote device comprises a software codec, wherein the software codec decompresses the processed data stream.

The remote device comprises a hardware codec, wherein the hardware codec decompresses the processed data stream.

The processing comprises using three-dimensional (3D) rendering and mapping warped video to a 3D space representing at least a portion of the lens geometry.

The processing comprises displaying a 3D view of the collected images via a display coupled to the remote device.

The remote device comprises a user interface comprising control gestures for navigating around the 3D view presented via the display.

The navigating comprises at least one of panning and zooming around the 3D view presented via the display, wherein the control gestures comprise at least one of pinching gestures and swiping gestures.

The camera comprises at least one of a video camera and an imaging camera.

The camera comprises a CMOS sensor and very wide FOV lens.

The monitoring unit of an embodiment comprises an audio system.

The monitoring unit of an embodiment comprises an alarm siren.

The at least one sensor comprises a motion sensor.

The motion sensor comprises a passive infrared (PIR) motion sensor with a very wide FOV Fresnel lens.

The at least one sensor comprises an environmental sensor.

The environmental sensor comprises at least one of a temperature sensor and a humidity sensor.

The at least one sensor comprises an accelerometer.

The at least one sensor comprises an ambient light sensor.

The monitoring unit of an embodiment comprises a power system.

The monitoring unit of an embodiment comprises at least one indicator coupled to the processor.

The at least one application generates at least one notification.

The at least one notification comprises one or more of a push message, an electronic mail, a telephone call, a Short-Message-Service (SMS) message, a notification to at least one contact.

The monitoring unit is coupled to one or more accessories.

The accessories are controlled by at least one of a timed schedule, a sunrise/sunset event, an ambient light level, and a temperature.

The monitoring unit of an embodiment comprises a rules engine executing on the processor.

The monitoring unit of an embodiment comprises a mobile application installed on the mobile device.

The mobile application generates a user interface presented on the mobile device, wherein the user interface provides access to at least one of the image and the sensor data.

The at least one application is at least one of accessed and controlled using the user interface.

The at least one sensor is controlled via the user interface.

The monitoring unit of an embodiment comprises at least one actuator coupled to the processor, wherein the at least one actuator is controlled via the user interface.

The monitoring unit of an embodiment comprises a heartbeat signal generated by the processor and transmitted to a remote device.

The monitoring unit of an embodiment comprises at least one remote server coupled to the network interface.

The coupling comprises at least one of a wide area network and a cellular network.

The at least one remote server comprises a central monitoring station.

The processor transmits to the central monitoring station at least one of the image and the sensor data.

The processor transmits to the central monitoring station a message comprising information representing at least one of the image and the sensor data.

The mobile device comprises a mobile application.

The mobile application comprises an interface for enabling and disabling remote monitoring by the central monitoring station.

The mobile application comprises an interface for controlling characteristics of the message and transmission of the message.

Embodiments described herein include a monitoring unit comprising a plurality of sensors. The plurality of sensors includes an image sensor. The monitoring unit comprises a network interface. The monitoring unit comprises a processor coupled to the plurality of sensors and the network interface. The monitoring unit comprises at least one application executing on the processor. The processor receives sensor data from the plurality of sensors. The processor generates an alert based upon a change in the sensor data. The alert is sent via the network interface to a mobile device associated with a user.

Embodiments described herein include a monitoring unit comprising: a plurality of sensors, wherein the plurality of sensors include an image sensor; a network interface; a processor coupled to the plurality of sensors and the network interface; and at least one application executing on the processor, wherein the processor receives sensor data from the plurality of sensors, wherein the processor generates an alert based upon a change in the sensor data, wherein the alert is sent via the network interface to a mobile device associated with a user.

Embodiments described herein include a system for remote monitoring. The system comprises a monitoring unit at a premises. The monitoring unit comprises a processor coupled to a plurality of sensors. The plurality of sensors includes an image sensor. The processor includes at least one application executing on the processor. The processor receives sensor data from the plurality of sensors and generates monitoring unit data. The system includes a server and a database located remote to the premises and coupled to the monitoring unit via a network coupling. The server receives the sensor data and the monitoring unit data and stores the sensor data and the monitoring unit data in the database. The server provides access to the sensor data and the monitoring unit data via a mobile device.

Embodiments described herein include a system for remote monitoring, the system comprising: a monitoring unit at a premises, the monitoring unit comprising a processor coupled to a plurality of sensors, wherein the plurality of sensors include an image sensor, wherein the processor includes at least one application executing on the processor, wherein the processor receives sensor data from the plurality of sensors and generates monitoring unit data; and a server and a database located remote to the premises and coupled to the monitoring unit via a network coupling, wherein the server receives the sensor data and the monitoring unit data and stores the sensor data and the monitoring unit data in the database, wherein the server provides access to the sensor data and the monitoring unit data via a mobile device.

The processor generates an alert based upon a change in at least one of the sensor data and the monitoring unit data, wherein the alert is sent to the mobile device.

The system of an embodiment comprises at least one communication module coupled to the processor.

The at least one communication module comprises a home area network (HAN) radio frequency (RF) module.

The at least one communication module comprises a Wi-Fi module.

The executing of the at least one application generates an enrollment process.

The enrollment process automatically places the WiFi module into an Access Point mode.

The mobile device comprises a mobile application, wherein the mobile application enrolls as a client to the Access Point.

The mobile application provides WiFi credentials to the processor via the Access Point.

At least one of the mobile application and the processor initiate storage of the WiFi credentials on the server.

At least one of the server and the processor restore the WiFi credentials from the server.

The mobile application provides authentication against at least one of the processor and a server.

The processor automatically switches the WiFi module to enroll as a client using the WiFi credentials.

The mobile application automatically switches the mobile device to enroll using the WiFi credentials.

The mobile application provides a user interface that includes at least one control for switching the processor to the Access Point mode to change the WiFi credentials.

The mobile application provides to a device location information corresponding to installation of the monitoring unit.

The device comprises the server.

The device comprises at least one of the monitoring unit and at least one additional monitoring unit.

The system of an embodiment comprises an administrative application that provides information about at least one monitoring unit that includes the location information.

The at least one communication module comprises a local area network (LAN) module.

The at least one communication module comprises a cellular data module.

The at least one communication module is coupled to a remote device to communicate with the remote device.

The at least one communication module is coupled to a remote device to communicate over an Internet Protocol (IP) channel.

The at least one communication module is coupled to a remote device to communicate over a cellular channel.

The communication comprises a two-way voice session with the remote device.

The communication comprises a data session, wherein video images are transmitted during the data session.

The remote device comprises the mobile device.

The remote device comprises a central monitoring station.

The communication module automatically establishes a coupling with the plurality of sensors.

The communication module automatically establishes a coupling with a local area network (LAN) at the premises.

The at least one application transfers data between at least one device on the LAN.

The communication module forms a sub-network at the premises.

The sub-network is a private network.

The plurality of sensors are coupled to the sub-network.

Devices couple to the sub-network and communicate over the sub-network, wherein the devices include at least one of wireless devices, wired devices, and IP devices.

The server includes a user account.

The image sensor comprises a camera including a lens.

The camera comprises a lens including a wide-angle geometry, wherein the camera generates images including warped images, wherein the camera generates the images using a wide-angle view mapped to the geometry of the lens from collected images.

The camera comprises an encoder that encodes collected images to generate a processed data stream.

The processed data stream is a compressed video stream.

The system of an embodiment comprises memory coupled to the camera, wherein the camera stores to the memory the processed data stream that includes warped video.

The memory is local to the camera.

The memory is remote to the camera.

The camera streams the processed data stream to a remote device, wherein the remote device comprises at least one of the mobile device and the server.

The camera streams the processed data stream directly to the remote device.

The camera streams the processed data stream to the remote device via at least one intermediary device.

Remote device processes the processed data stream using knowledge of a wide-angle geometry of the lens.

The processing comprises decompressing the processed data stream.

The remote device comprises a software codec, wherein the software codec decompresses the processed data stream.

The remote device comprises a hardware codec, wherein the hardware codec decompresses the processed data stream.

The processing comprises using three-dimensional (3D) rendering and mapping warped video to a 3D space representing at least a portion of the lens geometry.

The processing comprises displaying a 3D view of the collected images via a display coupled to the remote device.

The remote device comprises a user interface comprising control gestures for navigating around the 3D view presented via the display.

The navigating comprises at least one of panning and zooming around the 3D view presented via the display, wherein the control gestures comprise at least one of pinching gestures and swiping gestures.

The camera comprises at least one of a video camera and an imaging camera.

The camera comprises a CMOS sensor and very wide FOV lens.

The system of an embodiment comprises an audio system coupled to the processor.

The system of an embodiment comprises an alarm siren coupled to the processor.

The plurality of sensors comprises a motion sensor.

The motion sensor comprises a passive infrared (PIR) motion sensor with a very wide FOV Fresnel lens.

The plurality of sensors comprises an environmental sensor.

The environmental sensor comprises at least one of a temperature sensor and a humidity sensor.

The plurality of sensors comprises an accelerometer.

The plurality of sensors comprises an ambient light sensor.

The at least one application generates at least one notification corresponding to the alert.

The at least one notification comprises a notification to at least one contact.

The at least one notification comprises one or more of a push message, an electronic mail, a telephone call, and a Short-Message-Service (SMS) message.

The monitoring unit is coupled to one or more accessories.

The accessories are controlled by the monitoring unit data.

The accessories are controlled by a schedule.

The system of an embodiment comprises a rules engine executing on the processor.

The system of an embodiment comprises a mobile application installed on the mobile device.

The mobile application generates a user interface presented on the mobile device, wherein the user interface provides access to at least one of the image and the sensor data.

At least one of the server, the database, and the at least one application are at least one of accessed and controlled using the user interface.

The plurality of sensors are controlled via the user interface.

The system of an embodiment comprises at least one actuator coupled to the processor, wherein the at least one actuator is controlled via the user interface.

The system of an embodiment comprises a heartbeat signal generated by the processor and transmitted to at least one of the server and the mobile device.

The system of an embodiment comprises at least one remote server coupled to at least one of the monitoring unit, the server, and the mobile device.

The coupling comprises at least one of a wide area network and a cellular network.

The at least one remote server comprises a central monitoring station.

The processor transmits to the central monitoring station the monitoring unit data.

The processor transmits to the central monitoring station a message comprising information representing the monitoring unit data.

The mobile device comprises a mobile application.

The mobile application comprises an interface for enabling and disabling remote monitoring by the central monitoring station.

The mobile application comprises an interface for controlling characteristics of the message and transmission of the message.

The system of an embodiment comprises at least one additional monitoring unit at the premises.

The at least one additional monitoring unit is physically separated at the premises from the monitoring unit.

The at least one additional monitoring unit is coupled to the monitoring unit.

The coupling includes at least one of a wired coupling, wireless coupling, WiFi coupling, and IP coupling.

The system of an embodiment comprises forming an integrated security network at the premises by logically combining the at least one additional monitoring unit and the monitoring unit.

At least one of the monitoring unit and the at least one additional monitoring unit comprise an automatic installation process that automatically controls at least one of adding and removing a monitoring unit to the integrated network.

The system of an embodiment comprises a central monitoring station coupled to at least one of the server, the monitoring unit, and the at least one additional monitoring unit.

The monitoring unit and the at least one additional monitoring unit are monitored and controlled from the mobile device.

The monitoring unit and the at least one additional monitoring unit are monitored and controlled from the mobile device.

The server comprises a user account that corresponds to the monitoring unit and the at least one additional monitoring unit.

Embodiments described herein include a system for remote monitoring. The system comprises a monitoring unit at a premises. The monitoring unit comprises a processor coupled to a camera and a network interface. The processor includes at least one application executing on the processor. The processor receives monitoring unit data that includes images from the camera and sensor data from one or more sensors. The system includes a server located remote to the premises and coupled to the monitoring unit via the network interface. The server is coupled to a database. The server receives monitoring unit data from the monitoring unit and stores the monitoring unit data in the database. The server provides access to the monitoring unit data via a mobile device associated with a user.

Embodiments described herein include a system for remote monitoring, the system comprising: a monitoring unit at a premises, the monitoring unit comprising a processor coupled to a camera and a network interface, wherein the processor includes at least one application executing on the processor, wherein the processor receives monitoring unit data that includes images from the camera and sensor data from one or more sensors; and a server located remote to the premises and coupled to the monitoring unit via the network interface, wherein the server is coupled to a database, wherein the server receives monitoring unit data from the monitoring unit and stores the monitoring unit data in the database, wherein the server provides access to the monitoring unit data via a mobile device associated with a user.

Embodiments described herein include a system for remote monitoring. The system comprises a monitoring unit at a premises. The monitoring unit comprises a processor coupled to a plurality of sensors. The plurality of sensors includes an image sensor. The processor includes at least one application executing on the processor. The processor receives sensor data from the plurality of sensors and generates monitoring unit data. The system includes a server and a database located remote to the premises and coupled to the monitoring unit via a network coupling. The server receives the sensor data and the monitoring unit data and stores the sensor data and the monitoring unit data in the database. The server provides access to the sensor data and the monitoring unit data via a mobile device.

Embodiments described herein include a system for remote monitoring, the system comprising: a monitoring unit at a premises, the monitoring unit comprising a processor coupled to a plurality of sensors, wherein the plurality of sensors include an image sensor, wherein the processor includes at least one application executing on the processor, wherein the processor receives sensor data from the plurality of sensors and generates monitoring unit data; and a server and a database located remote to the premises and coupled to the monitoring unit via a network coupling, wherein the server receives the sensor data and the monitoring unit data and stores the sensor data and the monitoring unit data in the database, wherein the server provides access to the sensor data and the monitoring unit data via a mobile device.

Although certain methods, apparatus, computer readable memory, and articles of manufacture have been described herein, the scope of coverage of this disclosure is not limited thereto. To the contrary, this disclosure covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The embodiments described herein can be a component of a single system, multiple systems, and/or geographically separate systems. The embodiments described herein can also be a subcomponent or subsystem of a single system, multiple systems, and/or geographically separate systems. The embodiments described herein can be coupled to one or more other components (not shown) of a host system or a system coupled to the host system.

One or more components of the embodiments described herein and/or a corresponding system or application to which the embodiments described herein is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the embodiments described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the embodiments described herein and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the embodiments described herein and corresponding systems and methods include: microcontrollers with memory (such as electronically erasable programmable read only memory (EEPROM)), embedded microprocessors, firmware, software, etc. Furthermore, aspects of the embodiments described herein and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signalling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments and corresponding systems and methods is not intended to be exhaustive or to limit the systems and methods to the precise forms disclosed. While specific embodiments of, and examples for, the embodiments and corresponding systems and methods are described herein for illustrative purposes, various equivalent modifications are possible within the scope of the systems and methods, as those skilled in the relevant art will recognize. The teachings of the embodiments described herein and corresponding systems and methods provided herein can be applied to other systems and methods, not only for the systems and methods described above.

The elements and acts of the various embodiments described above can be combined to provide further embodiments. These and other changes can be made to the integrated security system and corresponding systems and methods in light of the above detailed description.

In general, in the following claims, the terms used should not be construed to limit the integrated security system and corresponding systems and methods to the specific embodiments disclosed in the specification and the claims, but should be construed to include all systems that operate under the claims. Accordingly, the integrated security system and corresponding systems and methods is not limited by the disclosure, but instead the scope is to be determined entirely by the claims.

While certain aspects of the embodiments described herein and corresponding systems and methods are presented below in certain claim forms, the inventors contemplate the various aspects of the embodiments described herein and corresponding systems and methods in any number of claim forms. Accordingly, the inventors reserve the right to add additional claims after filing the application to pursue such additional claim forms for other aspects of the embodiments described herein and corresponding systems and methods.

What is claimed is:

1. A computer-implemented method comprising:
   obtaining, from a mobile device, an operational state of a monitoring system located in a property;
   identifying a set of rules based on the operational state, wherein the set of rules comprises one or more notification-only rules and one or more security rules;
   determining that sensor data collected by one or more sensors located in the property is (i) logically related to a notification-only rule included in the one or more notification-only rules and (ii) not logically related to the one or more security rules; and
   transmitting, to the mobile device, a notification without triggering an alarm condition at the property based on determining that the sensor data is (i) logically related to a notification-only rule included in the one or more notification-only rules and (ii) not logically related to the one or more security rules.

2. The method of claim 1, wherein:
   the one or more sensors comprises a camera that includes a lens with a wide-angle geometry; and
   the camera is configured to generate a set of warped images using a wide-angle view mapped to the wide-angle geometry of the lens.

3. The method of claim 1, wherein the one or more sensors comprises an environmental sensor.

4. The method of claim 3, wherein the environmental sensor comprises at least one of a temperature sensor or a humidity sensor.

5. The method of claim 1, wherein the operational state identifies whether residents of the property are home, away from home, or on vacation.

6. The method of claim 1, further comprising:
   obtaining a second set of sensor data collected by the one or more sensors;
   determining that the second set of sensor data is logically related to the one or more security rules; and
   triggering an alarm siren at the property based on determining that the second set of sensor data is logically related to the one or more security rules.

7. The method of claim 1, wherein the set of rules are configurable by one or more residents of the property.

8. A system comprising:
   one or more computing devices; and
   one or more computer-readable storage media storing instructions that, when executed by the one or more computing devices, cause the one or more computing devices to perform operations comprising:
     obtaining, from a mobile device, an operational state of a monitoring system located in a property;
     identifying a set of rules based on the operational state, wherein the set of rules comprises one or more notification-only rules and one or more security rules;

determining that sensor data collected by one or more sensors located in the property is (i) logically related to a notification-only rule included in the one or more notification-only rules and (ii) not logically related to the one or more security rules; and transmitting, to the mobile device, a notification without triggering an alarm condition at the property based on determining that the sensor data is (i) logically related to a notification-only rule included in the one or more notification-only rules and (ii) not logically related to the one or more security rules.

9. The system of claim 8, wherein:
the one or more sensors comprises a camera that includes a lens with a wide-angle geometry; and
the camera is configured to generate a set of warped images using a wide-angle view mapped to the wide-angle geometry of the lens.

10. The system of claim 8, wherein the one or more sensors comprises an environmental sensor.

11. The system of claim 10, wherein the environmental sensor comprises at least one of a temperature sensor or a humidity sensor.

12. The system of claim 8, wherein the operational state identifies whether residents of the property are home, away from home, or on vacation.

13. The system of claim 8, wherein the operations further comprise:
obtaining a second set of sensor data collected by the one or more sensors;
determining that the second set of sensor data is logically related to the one or more security rules; and
triggering an alarm siren at the property based on determining that the second set of sensor data is logically related to the one or more security rules.

14. The system of claim 8, wherein the set of rules are configurable by one or more residents of the property.

15. At least one non-transitory computer-readable storage device storing instructions that, when executed by one or more processors, cause the one or more processors to perform operations comprising:
obtaining, from a mobile device, an operational state of a monitoring system located in a property;
identifying a set of rules based on the operational state, wherein the set of rules comprises one or more notification-only rules and one or more security rules;
determining that sensor data collected by one or more sensors located in the property is (i) logically related to a notification-only rule included in the one or more notification-only rules and (ii) not logically related to the one or more security rules; and
transmitting, to the mobile device, a notification without triggering an alarm condition at the property based on determining that the sensor data is (i) logically related to a notification-only rule included in the one or more notification-only rules and (ii) not logically related to the one or more security rules.

16. The non-transitory computer-readable storage device of claim 15, wherein:
the one or more sensors comprises a camera that includes a lens with a wide-angle geometry; and
the camera is configured to generate a set of warped images using a wide-angle view mapped to the wide-angle geometry of the lens.

17. The non-transitory computer-readable storage device of claim 15, wherein the one or more sensors comprises an environmental sensor.

18. The non-transitory computer-readable storage device of claim 17, wherein the environmental sensor comprises at least one of a temperature sensor or a humidity sensor.

19. The non-transitory computer-readable storage device of claim 15, wherein the operational state identifies whether residents of the property are home, away from home, or on vacation.

20. The non-transitory computer-readable storage device of claim 15, wherein the operations further comprise:
obtaining a second set of sensor data collected by the one or more sensors;
determining that the second set of sensor data is logically related to the one or more security rules; and
triggering an alarm siren at the property based on determining that the second set of sensor data is logically related to the one or more security rules.

\* \* \* \* \*